US010068363B2

(12) United States Patent
Laaksonen et al.

(10) Patent No.: US 10,068,363 B2
(45) Date of Patent: Sep. 4, 2018

(54) IMAGE POINT OF INTEREST ANALYSER WITH ANIMATION GENERATOR

(71) Applicant: Nokia Technologies Oy, Espoo (FI)

(72) Inventors: Lasse Juhani Laaksonen, Tampere (FI); Miikka Tapani Vilermo, Siuro (FI); Mikko Tapio Tammi, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/777,852

(22) PCT Filed: Mar. 27, 2013

(86) PCT No.: PCT/IB2013/052448
§ 371 (c)(1),
(2) Date: Sep. 17, 2015

(87) PCT Pub. No.: WO2014/155153
PCT Pub. Date: Oct. 2, 2014

(65) Prior Publication Data
US 2016/0086368 A1    Mar. 24, 2016

(51) Int. Cl.
G06T 13/80 (2011.01)
H04N 5/232 (2006.01)
(Continued)

(52) U.S. Cl.
CPC ............ G06T 13/80 (2013.01); G06F 3/013 (2013.01); G06K 9/46 (2013.01); G06T 7/73 (2017.01); H04N 5/232 (2013.01); H04N 5/23293 (2013.01); G06K 2009/4666 (2013.01); H04N 5/23216 (2013.01); H04N 7/142 (2013.01); H04N 9/8063 (2013.01)

(58) Field of Classification Search
None
See application file for complete search history.

(56) References Cited

U.S. PATENT DOCUMENTS 7,034,833 B2 *   4/2006   Epshteyn ............... G06T 13/80
                                                         345/473
7,206,022 B2     4/2007   Miller et al.
(Continued)

FOREIGN PATENT DOCUMENTS

WO    02052565 A1      7/2002
WO    2004057578 A1    7/2004

OTHER PUBLICATIONS

International Search Report and Written Opinion received for corresponding Patent Cooperation Treaty Application No. PCT/IB2013/052448, dated Mar. 12, 2014, 14 pages.
(Continued)

Primary Examiner — Said Broome
(74) Attorney, Agent, or Firm — Alston & Bird LLP

(57) ABSTRACT

An apparatus comprising a point of interest analyser configured to define at least one region within an image as an interest region, determine a position associated with the at least one region; an audio track generator configured to determine at least one audio signal based on the position; and an animated presentation generator configured to generate an animated image comprising the at least one region and the at least one audio signal.

22 Claims, 12 Drawing Sheets

(51) Int. Cl.
*G06F 3/01* (2006.01)
*G06K 9/46* (2006.01)
*G06T 7/73* (2017.01)
*H04N 7/14* (2006.01)
*H04N 9/806* (2006.01)

(56) References Cited

U.S. PATENT DOCUMENTS

| | | | | |
|---|---|---|---|---|
| 2002/0075295 | A1* | 6/2002 | Stentz | G09G 5/00 |
| | | | | 715/727 |
| 2003/0001846 | A1* | 1/2003 | Davis | G11B 27/031 |
| | | | | 345/474 |
| 2004/0130614 | A1 | 7/2004 | Valliath et al. | |
| 2006/0075422 | A1 | 4/2006 | Choi et al. | |
| 2007/0191986 | A1* | 8/2007 | Van Breemen | A63H 11/00 |
| | | | | 700/245 |
| 2008/0001951 | A1* | 1/2008 | Marks | A63F 13/06 |
| | | | | 345/474 |
| 2008/0292112 | A1 | 11/2008 | Valenzuela et al. | |
| 2008/0307307 | A1 | 12/2008 | Ciudad et al. | |
| 2011/0304632 | A1* | 12/2011 | Evertt | G06F 3/011 |
| | | | | 345/474 |
| 2012/0128160 | A1 | 5/2012 | Kim et al. | |
| 2012/0154633 | A1 | 6/2012 | Rodriguez | |
| 2012/0179742 | A1 | 7/2012 | Acharya et al. | |
| 2012/0188411 | A1 | 7/2012 | Jang | |
| 2012/0257036 | A1 | 10/2012 | Stenberg et al. | |
| 2013/0235223 | A1 | 9/2013 | Park et al. | |
| 2013/0235224 | A1 | 9/2013 | Park et al. | |
| 2013/0235559 | A1 | 9/2013 | Bergquist | |
| 2013/0300750 | A1 | 11/2013 | Mishra et al. | |

OTHER PUBLICATIONS

"Nikon—Imaging Products—New Function—Nikon 1 J1." [online] Retrieved from the Internet: Oct. 6, 2016 via the Internet Archive Wayback Machine at URL: <http://web.archive.org/web/20130115174030/http://imaging.nikon.com/lineup/acil/bodies/j1/features01.htm> (dated 2012), 3 pages.

"Nikon—Imaging Products—New Proposal of Movies and Still Images—Nikon 1 J2." [online] Retrieved from the Internet: Oct. 6, 2016 via the Internet Archive Wayback Machine at URL: <http://web.archive.org/web/20130126153521/http://imaging.nikon.com/lineup/acil/bodies/j2/features01.htm> (dated 2012), 4 pages.

Adobe: Using Adobe® Photoshop® CS5 Manual, (Dec. 5, 2011), 639 pages.

Kunka et al. "An New Method of Audio-Visual Correlation Analysis." Proceedings of the International Multiconference on Computer Science and Information Technology, Nov. 2009, pp. 497-502.

Nikon: 1-J1 Digital Camera Reference Manual, (2011), 216 pages.

* cited by examiner

IMAGE POINT OF INTEREST ANALYSER WITH ANIMATION GENERATOR

RELATED APPLICATION

This application was originally filed as Patent Cooperation Treaty Application No. PCT/IB2013/052448 filed Mar. 27, 2013.

FIELD

The present invention relates to a providing additional functionality for images. The invention further relates to, but is not limited to, display apparatus providing additional functionality for images displayed in mobile devices.

BACKGROUND

Many portable devices, for example mobile telephones, are equipped with a display such as a glass or plastic display window for providing information to the user. Furthermore such display windows are now commonly used as touch sensitive inputs. In some further devices the device is equipped with transducers suitable for generating audible feedback.

Images and animated images are known. Animated images or cinemagraph images can provide the illusion that the viewer is watching a video. The cinemagraph are typically still photographs in which a minor and repeated movement occurs. These are particularly useful as they can be transferred or transmitted between devices using significantly smaller bandwidth than conventional video.

STATEMENT

According to an aspect, there is provided a method comprising: defining at least one region within an image as an interest region; determining a position associated with the at least one region; determining at least one audio signal based on the position; and generating an animated Image comprising the at least one region and the at least one audio signal.

The method may further comprise capturing the image using at least one camera associated with the apparatus.

The method may further comprise displaying the image on a display associated with the apparatus.

Defining at least one region may comprise at least one of: analysing the image to determine the at least one region; receiving a user input defining the at least one region; receiving a touch input over a displayed version of the image defining the at least one region; analysing eye/gaze positioning of a displayed version of the image to determine the at least one region; and analysing audio signals associated with the image to determine the at least one region.

Determining at least one audio signal based on the position may comprise: filtering at least one input audio signal based on the position to generate at least one positional audio signal part; and synthesizing the at least one audio signal from the at least one positional audio signal part.

Filtering at least one input audio signal based on the position to generate at least one positional audio signal part may comprise: analysing the at least one input audio signal to determine at least one positional component; selecting at least one of the positional components based on the position associated with the at least one region; and synthesizing the at least one audio signal from the at least one of the positional components.

Synthesizing the at least one audio signal from the at least one of the positional components may further comprise synthesizing the at least one audio signal from the at least one positional component and a non-positional/ambient audio signal component.

Filtering at least one input audio signal based on the position to generate at least one positional audio signal part may comprise: separating the at least one input audio signal into at least two parts based on the position associated with the at least one region.

The method may further comprise determining a time period associated with the at least one region and wherein generating at least one audio signal based on the position further comprises generating the at least one audio signal based on the position and the time period associated with the at least one region.

Determining the at least one audio signal based on the position and the time period associated with the at least one region may comprise: spatially and temporally filtering at least one input audio signal based on the position and time period associated with the at least one region to generate at least one spatially and temporally filtered audio signal part; and synthesizing the at least one audio signal from the at least one spatially and temporally filtered audio signal part.

The method may further comprise: displaying the at least one positional audio signal part on the display; displaying at least one control element associated with the at least one positional audio signal part on the display; and controlling the application of the at least one positional audio signal part based on an input associated with the at least one control element.

Displaying at least one control element associated with the at least one positional audio signal part on the display may comprise at least one of: displaying a muting control element associated with the at least one positional audio signal part on the display, wherein the at least one positional audio signal part is muted/unmuted based on the input associated with the muting control element; displaying a volume control element associated with the at least one positional audio signal part on the display, wherein a volume of the at least one positional audio signal part is based on the input associated with the volume control element; and displaying a fading control element associated with the at least one positional audio signal part on the display, wherein the fading up/fading down of the at least one positional audio signal part is based on the input associated with the fading control element.

Defining at least one region within an image as an interest region may comprise: defining at least two regions within an image; and selecting at least one region from the at least two regions within an image as an interest region.

Determining a position associated with the at least one region may comprise determining a position relative to an apparatus.

According to a second aspect there is provided an apparatus comprising: means for defining at least one region within an image as an interest region; means for determining a position associated with the at least one region; means for determining at least one audio signal based on the position; and means for generating an animated image comprising the at least one region and the at least one audio signal.

The apparatus may further comprise means for capturing the image using at least one camera associated with the apparatus.

The apparatus may further comprise means for displaying the image on a display associated with the apparatus.

The means for defining at least one region may comprise at least one of: means for analysing the image to determine the at least one region; means for receiving a user input defining the at least one region; means for receiving a touch input over a displayed version of the image defining the at least one region; means for analysing eye/gaze positioning of a displayed version of the image to determine the at least one region; and means for analysing audio signals associated with the image to determine the at least one region.

The means for determining at least one audio signal based on the position may comprise: means for filtering at least one input audio signal based on the position to generate at least one positional audio signal part; and means for synthesizing the at least one audio signal from the at least one positional audio signal part.

The means for filtering at least one input audio signal based on the position to generate at least one positional audio signal part may comprise: means for analysing the at least one input audio signal to determine at least one positional component; means for selecting at least one of the positional components based on the position associated with the at least one region; and means for synthesizing the at least one audio signal from the at least one of the positional components.

The means for synthesizing the at least one audio signal from the at least one of the positional components may further comprise means for synthesizing the at least one audio signal from the at least one positional component and a non-positional/ambient audio signal component.

The means for filtering at least one input audio signal based on the position to generate at least one positional audio signal part may comprise: means for separating the at least one input audio signal into at least two parts based on the position associated with the at least one region.

The apparatus may further comprise means for determining a time period associated with the at least one region and wherein the means for generating at least one audio signal based on the position may further comprise means for generating the at least one audio signal based on the position and the time period associated with the at least one region.

The means for determining the at least one audio signal based on the position and the time period associated with the at least one region may comprise: means for spatially and temporally filtering at least one input audio signal based on the position and time period associated with the at least one region to generate at least one spatially and temporally filtered audio signal part; and means for synthesizing the at least one audio signal from the at least one spatially and temporally filtered audio signal part.

The apparatus may further comprise: means for displaying the at least one positional audio signal part on the display; means for displaying at least one control element associated with the at least one positional audio signal part on the display; means for controlling the application of the at least one positional audio signal part based on an input associated with the at least one control element.

The means for displaying at least one control element associated with the at least one positional audio signal part on the display may comprise at least one of: means for displaying a muting control element associated with the at least one positional audio signal part on the display, wherein the at least one positional audio signal part is muted/unmuted based on the input associated with the muting control element; means for displaying a volume control element associated with the at least one positional audio signal part on the display, wherein a volume of the at least one positional audio signal part is based on the input associated with the volume control element; and means for displaying a fading control element associated with the at least one positional audio signal part on the display, wherein the fading up/fading down of the at least one positional audio signal part is based on the input associated with the fading control element.

The means for defining at least one region within an image as an interest region may comprise: means for defining at least two regions within an image; and means for selecting at least one region from the at least two regions within an image as an interest region.

The means for determining a position associated with the at least one region may comprise means for determining a position relative to an apparatus.

According to a third aspect there is provided an apparatus comprising at least one processor and at least one memory including computer code for one or more programs, the at least one memory and the computer code configured to with the at least one processor cause the apparatus to at least: define at least one region within an image as an interest region; determine a position associated with the at least one region; determine at least one audio signal based on the position; and generate an animated image comprising the at least one region and the at least one audio signal.

The apparatus may further be caused to capture the image using at least one camera associated with the apparatus.

The apparatus may further be caused to display the image on a display associated with the apparatus.

Defining at least one region may cause the apparatus to perform at least one of: analyse the image to determine the at least one region; receive a user input defining the at least one region; receive a touch input over a displayed version of the image defining the at least one region; analyse eye/gaze positioning of a displayed version of the image to determine the at least one region; and analyse audio signals associated with the image to determine the at least one region.

Determining at least one audio signal based on the position may cause the apparatus to: filter at least one input audio signal based on the position to generate at least one positional audio signal part; and synthesize the at least one audio signal from the at least one positional audio signal part.

Filtering at least one input audio signal based on the position to generate at least one positional audio signal part may cause the apparatus to: analyse the at least one input audio signal to determine at least one positional component; select at least one of the positional components based on the position associated with the at least one region; and synthesize the at least one audio signal from the at least one of the positional components.

Synthesizing the at least one audio signal from the at least one of the positional components may further cause the apparatus to synthesize the at least one audio signal from the at least one positional component and a non-positional/ambient audio signal component.

Filtering at least one input audio signal based on the position to generate at least one positional audio signal part may cause the apparatus to: separate the at least one input audio signal into at least two parts based on the position associated with the at least one region.

The apparatus may further be caused to determine a time period associated with the at least one region and wherein generating at least one audio signal based on the position may further cause the apparatus to generate the at least one audio signal based on the position and the time period associated with the at least one region.

Determining the at least one audio signal based on the position and the time period associated with the at least one region may cause the apparatus to: spatial and time filter at least one input audio signal based on the position and time period associated with the at least one region to generate at least one spatial and time filtered audio signal part; and synthesize the at least one audio signal from the at least one spatial and time filtered audio signal part.

The apparatus may further be caused to: display the at least one positional audio signal part on the display; display at least one control element associated with the at least one positional audio signal part on the display; and control the application of the at least one positional audio signal part based on an input associated with the at least one control element.

Displaying at least one control element associated with the at least one positional audio signal part on the display may cause the apparatus to perform at least one of: display a muting control element associated with the at least one positional audio signal part on the display, wherein the at least one positional audio signal part is muted/unmated based on the input associated with the muting control element; display a volume control element associated with the at least one positional audio signal part on the display, wherein a volume of the at least one positional audio signal part is based on the input associated with the volume control element; and display a fade control element associated with the at least one positional audio signal part on the display, wherein the fading up/fading down of the at least one positional audio signal part is based on the input associated with the fade control element.

Defining at least one region within an image as an interest region may cause the apparatus to: define at least two regions within an image; and select at least one region from the at least two regions within an image as an interest region.

Determining a position associated with the at least one region may cause the apparatus to determine a position relative to an apparatus.

According to a fourth aspect there is provided an apparatus comprising: a point of interest analyser configured to define at least one region within an image as an interest region, determine a position associated with the at least one region; an audio track generator configured to determine at least one audio signal based on the position; and an animated presentation generator configured to generate an animated image comprising the at least one region and the at least one audio signal.

The apparatus may further comprise at least one camera configured to capture the image.

The apparatus may further comprise at least one display configured to display the image.

The point of interest analyser may be configured to: analyse the image to determine the at least one region; receive a user input defining the at least one region; receive a touch input over a displayed version of the image defining the at least one region; analyse eye/gaze positioning of a displayed version of the image to determine the at least one region; and receive an analysis of audio signals associated with the image to determine the at least one region.

The apparatus may comprise a spatial audio analyser configured to analyse the audio signals associated with the image to determine the at least one region.

The audio track generator may comprise: a filter configured to filter at least one input audio signal based on the position to generate at least one positional audio signal part; and a synthesizer configured to synthesize the at least one audio signal from the at least one positional audio signal part.

The apparatus may comprise: a spatial audio analyser configured to analyse the at least one input audio signal to determine at least one positional component; a spatial filter configured to select at least one of the positional components based on the position associated with the at least one region; and a synthesizer synthesize the at least one audio signal from the at least one of the positional components.

The synthesizer may be configured to synthesize the at least one audio signal from the at least one positional component and a non-positional/ambient audio signal component.

The filter may comprise: a spatial filter configured to separate the at least one input audio signal into at least two parts based on the position associated with the at least one region.

The apparatus may further comprise a temporal selector configured to determine a time period associated with the at least one region and wherein the audio track generator may be configured to generate the at least one audio signal based on the position and the time period associated with the at least one region.

The audio track generator may comprise: at least one spatial filter and at least one time filter configured to a spatial and time filter at least one input audio signal based on the position and time period associated with the at least one region to generate at least one spatial and time filtered audio signal part; and a synthesizer configured to synthesize the at least one audio signal from the at least one spatial and time filtered audio signal part.

The apparatus may further comprise a display generator configured to: display the at least one positional audio signal part on the display; display at least one control element associated with the at least one positional audio signal part on the display; and control the application of the at least one positional audio signal part based on an input associated with the at least one control element.

The a display generator may be configured to generate at least one of: a muting control element associated with the at least one positional audio signal part on the display, wherein the at least one positional audio signal part is muted/unmuted based on the input associated with the muting control element; a volume control element associated with the at least one positional audio signal part on the display, wherein a volume of the at least one positional audio signal part is based on the input associated with the volume control element; and a fade control element associated with the at least one positional audio signal part on the display, wherein the fading up/fading down of the at least one positional audio signal part is based on the input associated with the fade control element.

The point of interest analyser/selector may be configured to define at least two regions within an image; and further configured to select at least one region from the at least two regions within an image as an interest region.

The point of interest analyser/selector may be configured to determine a position relative to an apparatus.

An apparatus may be configured to perform the method as described herein.

A computer program product comprising program instructions may cause an apparatus to perform the method as described herein.

A computer program product stored on a medium may cause an apparatus to perform the method as described herein.

An electronic device may comprise apparatus as described herein.

A chipset may comprise apparatus as described herein.

SUMMARY OF FIGURES

For better understanding of the present invention, reference will now be made by way of example to the accompanying drawings in which.

DESCRIPTION OF EXAMPLE EMBODIMENTS

Figure 1:
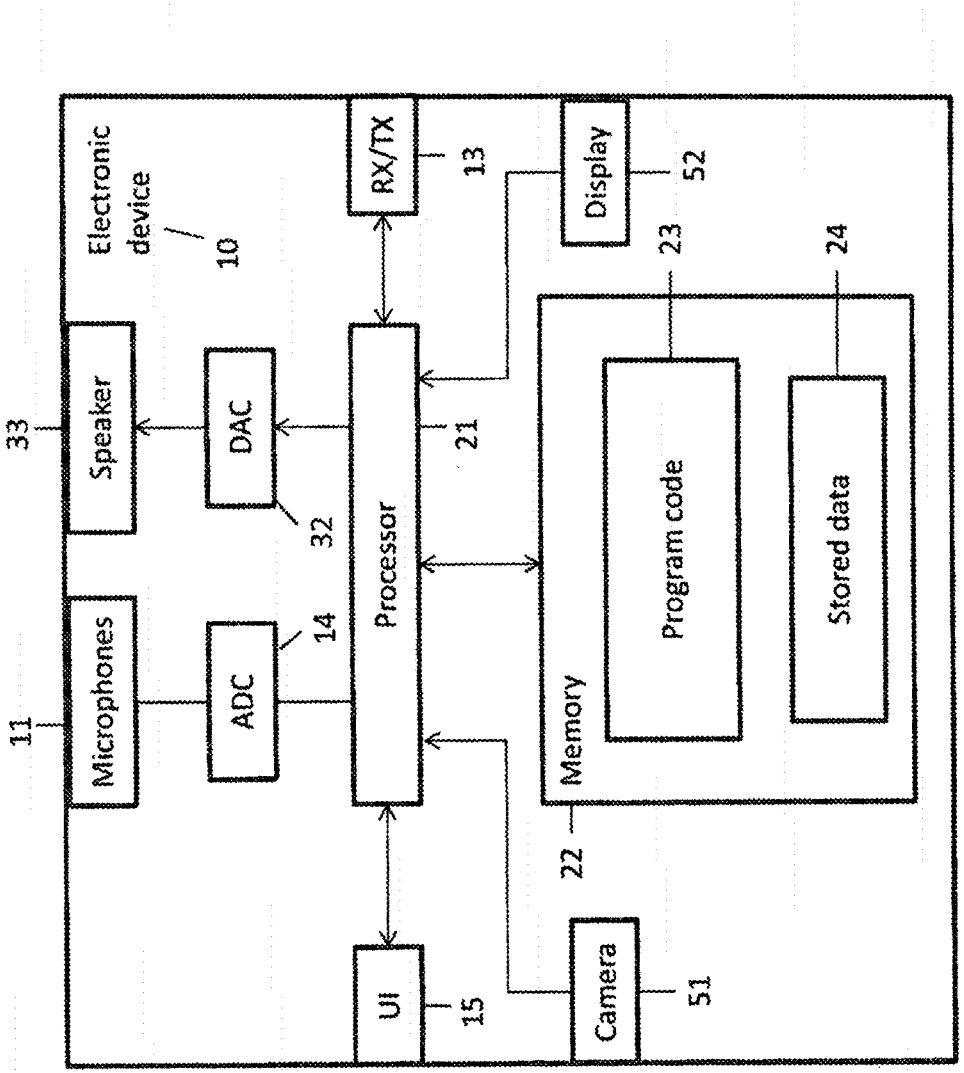
FIG. 1 shows schematically an apparatus suitable for employing some embodiments.

The concept of embodiments of the application is to combine audio signals to cinemagraphs (animated images) during the generation of cinemagraphs or animated images.

Image capture and enhancement or processing is a largely subjective decision. For example although filter effects are commonly fairly easy to apply, using and combining them in a way that complements rather than distracts from the subject matter is an acquired skill. An image capture and processing system which employs effects which are more effective for the average user appears to require settings of parameters used in the processing which are to some degree content-aware. For example of particular interest are such filters that apply a modification only to some parts of an image (e.g., black-and-white conversion is applied to most of an image, but an important detail is kept in colour). Of further interest are such effects that combine elements of several successive pictures (or separate frames of video footage) into a single presentation and are known as animated images or cinemagraphs.

Cinemagraphs or animated images are seen as an extension of a photograph and produced using postproduction techniques. The cinemagraph provides a means to enable motion of an object common between images or in a region of an otherwise still or static picture. For example the design or aesthetic element allows subtle motion elements while the rest of the image is still. In some cinemagraphs the motion or animation feature is repeated. In the following description and claims the term object, common object, or subject can be considered to refer to any element, object or component which is shared (or mutual) across the images used to create the cinemagraph or animated object. For example the images used as an input could be a video of a moving toy train against a substantially static background. In such an example the object, subject, common object, region, or element can be the toy train which in the animated image provides the dynamic or subtle motion element whilst the rest of the image is still. It would be understood that whether the object or subject is common does not necessitate that the object, subject, or element is substantially identical from frame to frame. However typically there is a large degree of correlation between subsequent image objects as the object moves or appears to move. For example the object or subject of the toy train can appear to move to and from the observer from frame to frame in such a way that the train appears to get larger/smaller or the toy train appears to turn away from or to the observer by the toy train profile changing.

The size, shape and position of the position of interest or in other words the region of the image identified as the subject, object or element can change from image to image, however within the image is a selected entity which from frame to frame has a degree of correlation (as compared to the static image components which have substantially perfect correlation from frame to frame).

An issue or problem is the selection of 'important' areas within a picture which can then be used to form the animation elements. There have been previously attempts to overcome this problem by means of automatically analysing image content.

Furthermore combining authentic audio to such presentations as the cinemagraphs is also problematic as the selection of a suitable audio clip or track to accompany the image is also largely a subjective one.

The presentation of cinemagraph with 'authentic' audio is of interest for future entertainment and artistic applications. In the context of mobile devices, the process of creating such presentations and effects should be as straightforward, simple, and automatic as possible. However as indicated herein a degree of user input has been required to provide opportunities for artistic control in content creation.

It has been proposed that 'image quality' estimation can be used to provide some element of control in the generation of such images as described herein. In such situations the image is analysed to generate an overall quality of the image value or a relative quality of parts of an image value based on objective measures. Such measures can include sharpness/blurriness, colour saturation, noise level, contrast, amount of information (entropy) and other determined values. All of these are useful measures, and a well-trained classifier using several of these measures can be used to group photos or video frames (or regions of them) into good/important ones and poor ones. However these methods can also produce drastic failures since these algorithms do not understand the cultural or human aspects of the images and are not able to assess the content/context of the image.

Other approaches which have been proposed include methods based on content analysis and pattern recognition. For example, face recognition can be very effective in finding the 'important' parts in an image and there is often an assumption that a human face is important in a picture. There are however countless examples where that assumption is false, for example a photo of a strong silhouette in a view of a busy street among recognizable faces. In this case, the real focus of the image could be that of the silhouette. Another example would be a picture from behind a couple holding hands on a beach next to an advertisement billboard with a face. In this case, the 'important' aspect of the image is more likely to be the couple against the scenery (and often the billboard would be cropped out). Thus in a manner similar to the 'image quality' methods while individual aspects and patterns may be recognized, their connections, relations, subjective meanings, context and the whole cultural content of the image are not considered or remain unknown to the algorithm.

Thus generally to generate an animated presentation which include the photographic effect of combining either several still images or still images and video footage to realize the so-called cinemagraph images (often available as GIF files) is generally done manually by applying layers and masks in image editing programs or by utilizing dedicated cinemagraph applications. The adding of audio to the presentation is generally done manually.

The concept in some embodiments is therefore to utilize eye/gaze tracking to understand or categorize the 'important' details and regions within images. Thus for example the eye/gaze tracking analysis can determine a time spent looking at an image and the points and regions of interest revealed by eye tracking as well as the trajectories of gazing around the image to categorise the image content. The implemented embodiments can for example on a mobile device collect the information at the time of taking the picture, and when the user is viewing the images in the gallery application, by utilizing a front-facing camera. Combining this information with other image quality and content analysis solutions can therefore in some embodiments as described herein improve the reliability of the content analysis metrics.

In some embodiments the video (or similarly still image) scene field of view and the audio scene can be analysed together to assist in the detection of points of interest and also determining audio tracks to associate with the image(s).

In some embodiments as described herein the apparatus is configured to locate points of interest (PoI) in successive still images (for example images taken in a burst mode) or video frames, and to utilize the analysis of the scene to classify the sound sources in the image (especially those associated with the identified PoI's) and outside the image based on their direction of arrival. In some embodiments by applying the PoI information the apparatus can be configured to create potential cinemagraph effects from the visual data. Furthermore in some embodiments an audio track can be added to provide a multimedia cinemagraph. Potential audio tracks can be determined or generated based on the analysis of the audio signals (directions) corresponding to the PoI's used for the cinemagraph.

In some embodiments a user interface (UI) is provided for the user to control the presets/automatic edits. In such embodiments a user of the apparatus can control the elements that move in the cinemagraph, as well as properties associated with the motion such as the speed/frequency of the movement. In some embodiments the user interface can further be used to enable the apparatus to fine-tune the point of interest element boundaries (up to pixel level). In some embodiments the user interface can enable the user to control the associated audio, for example gain, fade in, fade out, and playback speed. In some embodiments multiple tracks can be generated, for example other audio elements can be included or selected such as for example the ambient audio track provided by the scene analysis.

With respect to FIG. 1 a schematic block diagram of an example electronic device 10 or apparatus on which embodiments of the application can be implemented. The apparatus 10 is such embodiments configured to provide improved image experiences.

The apparatus 10 is in some embodiments a mobile terminal, mobile phone or user equipment for operation in a wireless communication system. In other embodiments, the apparatus is any suitable electronic device configured to process video and audio data. In some embodiments the apparatus is configured to provide an image display, such as for example a digital camera, a portable audio player (mp3 player), a portable video player (mp4 player). In other embodiments the apparatus can be any suitable electronic device with touch interface (which may or may not display information) such as a touch-screen or touch-pad configured to provide feedback when the touch-screen or touch-pad is touched. For example in some embodiments the touch-pad can be a touch-sensitive keypad which can in some embodiments have no markings on it and in other embodiments have physical markings or designations on the front window. The user can in such embodiments be notified of where to touch by a physical identifier—such as a raised profile, or a printed layer which can be illuminated by a light guide.

The apparatus 10 comprises a touch input module 15 or in some embodiments any suitable user interface (UI), which is linked to a processor 21. The processor 21 is further linked to a display 52. The processor 21 is further linked to a transceiver (TX/RX) 13 and to a memory 22.

In some embodiments, the touch input module (or user interface) 15 and/or the display 52 are separate or separable from the electronic device and the processor receives signals from the touch input module (or user interface) 15 and/or transmits and signals to the display 52 via the transceiver 13 or another suitable interface. Furthermore in some embodiments the touch input module (or user interface) 15 and display 52 are parts of the same component. In such embodiments the touch interface module (or user interface) 15 and display 52 can be referred to as the display part or touch display part.

The processor 21 can in some embodiments be configured to execute various program codes. The implemented program codes, in some embodiments can comprise such routines as audio signal analysis and audio signal processing, image analysis, touch processing, gaze or eye tracking. The implemented program codes can in some embodiments be stored for example in the memory 22 and specifically within a program code section 23 of the memory 22 for retrieval by the processor 21 whenever needed. The memory 22 in some embodiments can further provide a section 24 for storing data, for example data that has been processed in accordance with the application, for example audio signal data.

The touch input module (or user interface) 15 can in some embodiments implement any suitable touch screen interface technology. For example in some embodiments the touch screen interface can comprise a capacitive sensor configured to be sensitive to the presence of a finger above or on the touch screen interface. The capacitive sensor can comprise an insulator (for example glass or plastic), coated with a transparent conductor (for example indium tin oxide—ITO). As the human body is also a conductor, touching the surface of the screen results in a distortion of the local electrostatic field, measurable as a change in capacitance. Any suitable technology may be used to determine the location of the touch. The location can be passed to the processor which may calculate how the user's touch relates to the device. The insulator protects the conductive layer from dirt, dust or residue from the finger.

In some other embodiments the touch input module (or user interface) can be a resistive sensor comprising of several layers of which two are thin, metallic, electrically conductive layers separated by a narrow gap. When an object, such as a finger, presses down on a point on the panel's outer surface the two metallic layers become connected at that point: the panel then behaves as a pair of voltage dividers with connected outputs. This physical change therefore causes a change in the electrical current which is registered as a touch event and sent to the processor for processing.

In some other embodiments the touch input module (or user interface) can further determine a touch using technologies such as visual detection for example a camera either located below the surface or over the surface detecting the position of the finger or touching object, projected capacitance detection, infra-red detection, surface acoustic wave detection, dispersive signal technology, and acoustic pulse recognition. In some embodiments it would be understood that 'touch' can be defined by both physical contact and 'hover touch' where there is no physical contact with the sensor but the object located in close proximity with the sensor has an effect on the sensor.

The touch input module as described here is an example of a user interface 15. It would be understood that in some other embodiments any other suitable user interface input can be employed to provide an user interface input, for example to select an item, object, or region from a displayed screen. In some embodiments the user interface input can thus be a keyboard, mouse, keypad, joystick or any suitable pointer device.

The apparatus 10 can in some embodiments be capable of implementing the processing techniques at least partially in hardware, in other words the processing carried out by the processor 21 may be implemented at least partially in hardware without the need of software or firmware to operate the hardware.

The transceiver 13 in some embodiments enables communication with other electronic devices, for example in some embodiments via a wireless communication network.

The display 52 may comprise any suitable display technology. For example the display element can be located below the touch input module (or user interface) and project an image through the touch input module to be viewed by the user. The display 52 can employ any suitable display technology such as liquid crystal display (LCD), light emitting diodes (LED), organic light emitting diodes (OLED), plasma display cells, Field emission display (FED), surface-conduction electron-emitter displays (SED), and Electrophoretic displays (also known as electronic paper, e-paper or electronic ink displays). In some embodiments the display 12 employs one of the display technologies projected using a light guide to the display window.

The apparatus 10 can in some embodiments comprise an audio-video subsystem. The audio-video subsystem for example can comprise in some embodiments a microphone or array of microphones 11 for audio signal capture. In some embodiments the microphone or array of microphones can be a solid state microphone, in other words capable of capturing audio signals and outputting a suitable digital format signal. In some other embodiments the microphone or array of microphones 11 can comprise any suitable microphone or audio capture means, for example a condenser microphone, capacitor microphone, electrostatic microphone, Electret condenser microphone, dynamic microphone, ribbon microphone, carbon microphone, piezoelectric microphone, or micro electrical-mechanical system (MEMS) microphone. In some embodiments the microphone 11 is a digital microphone array, in other words configured to generate a digital signal output (and thus not requiring an analogue-to-digital converter). The microphone 11 or array of microphones can in some embodiments output the audio captured signal to an analogue-to-digital converter (ADC) 14.

In some embodiments the apparatus can further comprise an analogue-to-digital converter (ADC) 14 configured to receive the analogue captured audio signal from the microphones and outputting the audio captured signal in a suitable digital form. The analogue-to-digital converter 14 can be any suitable analogue-to-digital conversion or processing means. In some embodiments the microphones are 'integrated' microphones containing both audio signal generating and analogue-to-digital conversion capability.

In some embodiments the apparatus 10 audio-video subsystem further comprises a digital-to-analogue converter 32 for converting digital audio signals from a processor 21 to a suitable analogue format. The digital-to-analogue converter (DAC) or signal processing means 32 can in some embodiments be any suitable DAC technology.

Furthermore the audio-video subsystem can comprise in some embodiments a speaker 33. The speaker 33 can in some embodiments receive the output from the digital-to-analogue converter 32 and present the analogue audio signal to the user.

In some embodiments the speaker 33 can be representative of multi-speaker arrangement, a headset, for example a set of headphones, or cordless headphones. The speaker in some embodiments can thus be representative as any suitable audio output means.

In some embodiments the apparatus audio-video subsystem comprises at least one camera 51 or image capturing means configured to supply to the processor 21 image data. In some embodiments the camera can be configured to supply multiple images over time to provide a video stream. In some embodiments the apparatus 10 comprises two cameras, a first or 'rear' camera which when the apparatus is used in a normal mode is configured to capture images away from the user of the apparatus and a second or 'front' camera which when the apparatus is in normal use is configured to capture images towards the user of the apparatus. It would be understood that in some embodiments a single camera with multiple lens ports or a camera which can be moved can perform the role of both 'front' and 'rear' cameras. Furthermore it would be understood that in some embodiments the 'front' and 'rear' cameras can be implemented by flipping or rotating an apparatus with a single camera away from and towards the user. In some embodiments the 'front' camera can be defined as being the camera located on the same side or face of the apparatus as the display 52, in other words when the user is looking at the display they are also looking at the 'front' camera.

Figure 2:
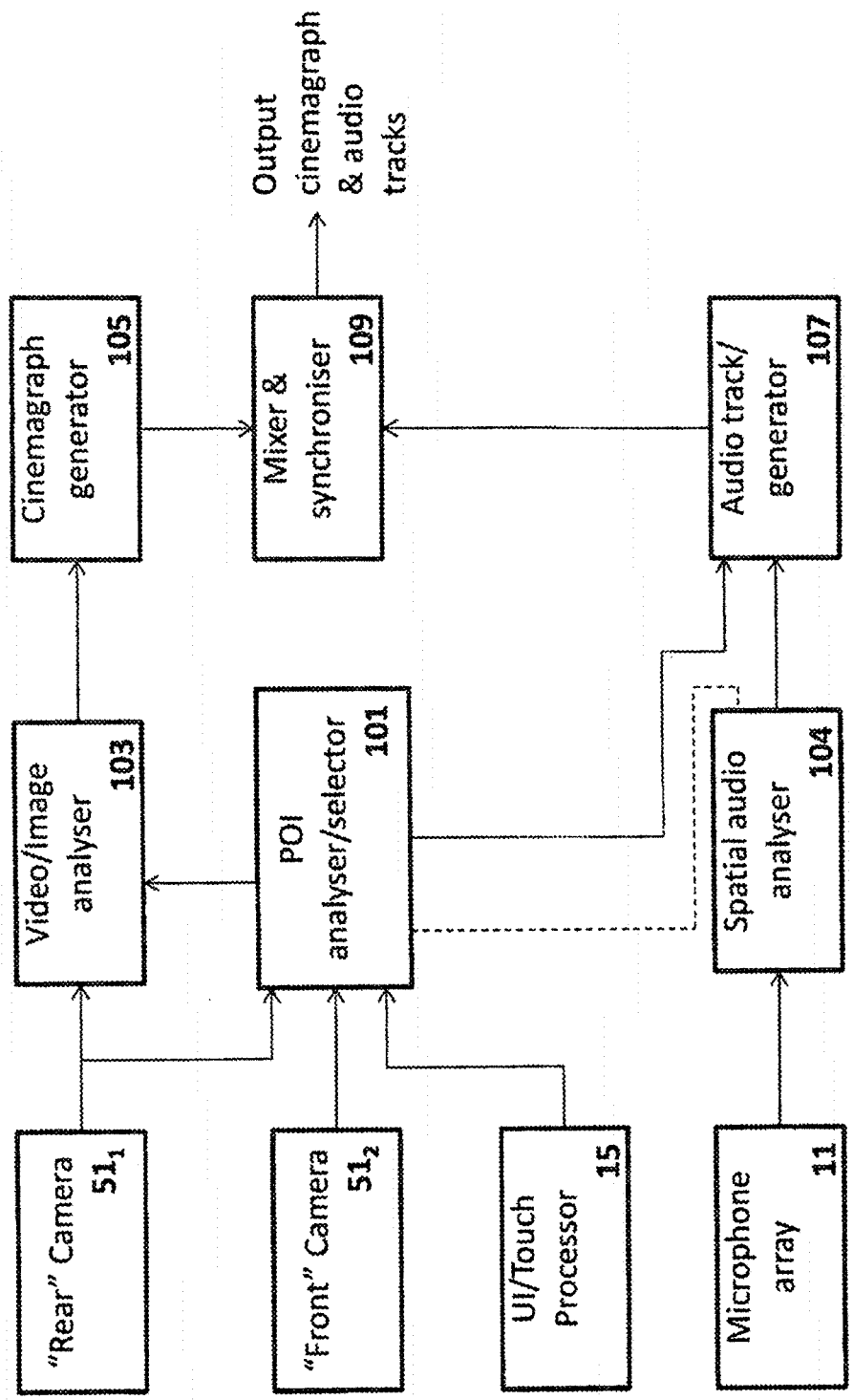
FIG. 2 shows schematically an example audio enhanced cinemagraph generator.

With respect to FIG. 2 an example audio enhanced cinemagraph generator is shown. Furthermore with respect to FIG. 3 the operation of the example audio enhanced cinemagraph generator as shown in FIG. 2 is further described.

In some embodiments the audio enhanced cinemagraph generator comprises a 'rear' camera $51_1$. The 'rear' camera $51_1$ or means for capturing images can be any suitable video or image capturing apparatus. The 'rear' camera $51_1$ can be configured to capture images that the user of the apparatus wishes to process and pass the image or video data to a point of interest analyser/selector 101 and a video/image analyser 103.

Figure 3:
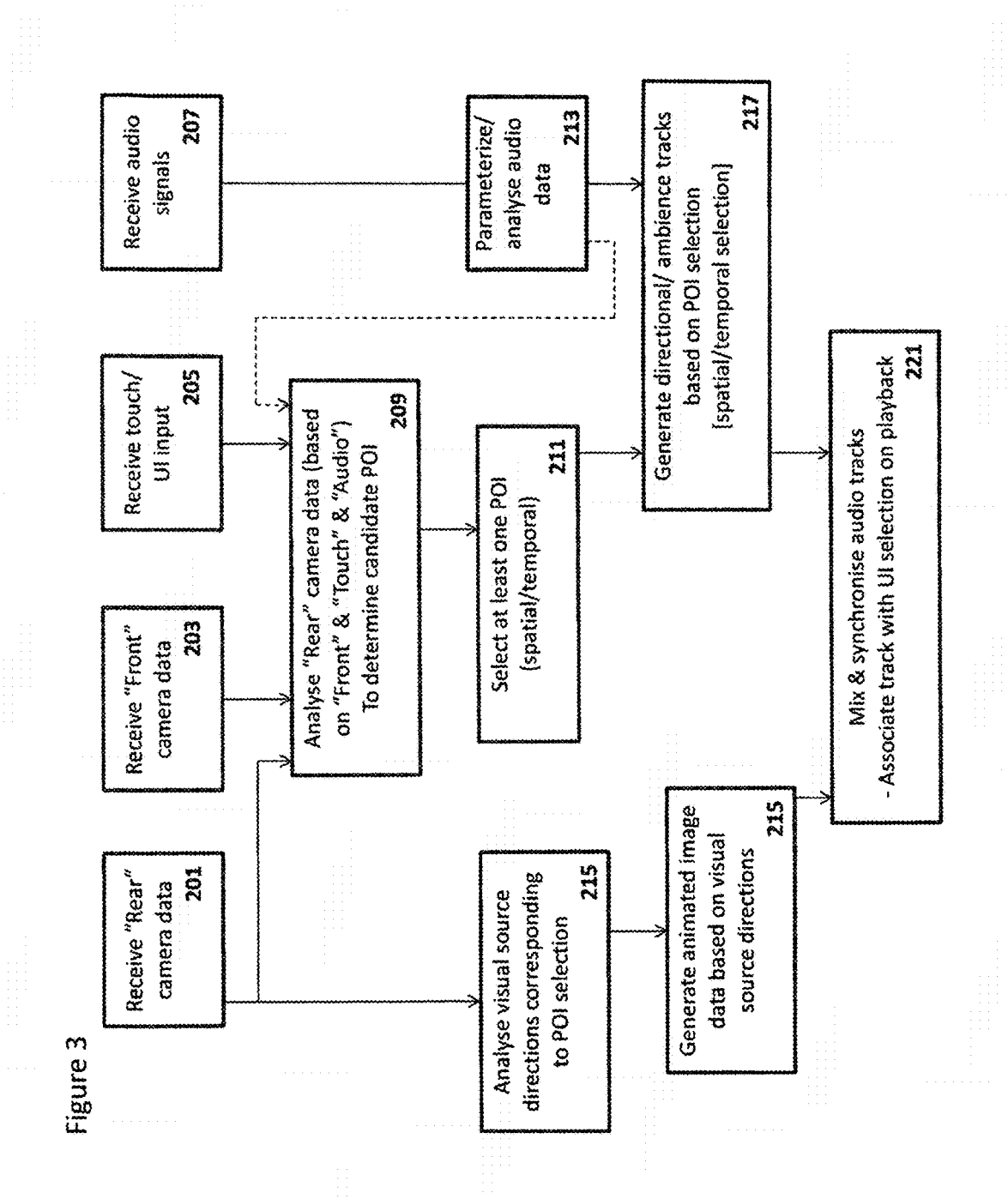
FIG. 3 shows a flow diagram of the operation of the audio enhanced cinemagraph generator as shown in FIG. 2 according to some embodiments.

The operation of capturing or receiving video or images from the 'rear' camera is shown in FIG. 3 by step 201.

In some embodiments the audio enhanced cinemagraph generator comprises a 'front' camera $51_2$. The 'front' camera $51_2$ or means for capturing images can be any suitable video or image capturing apparatus. The 'front' camera $51_2$ can be configured to capture images and pass the image or video data to a point of interest analyser/selector 101. The 'front' camera 51₂ can in some embodiments be configured to capture or record the user as they operate the apparatus.

The operation of capturing or receiving video or images from the 'front' camera is shown in FIG. 3 by step 203.

Furthermore in some embodiments the audio enhanced cinemagraph generator comprises a user interface input or means for providing a user interface input such as a touch processor (as described herein) configured to receive touch screen input and output control inputs to the apparatus. For example in some embodiments the touch screen input is an input representing a pixel, area, or region of a displayed image, the displayed image being that of one captured or recorded by the 'rear' camera. The user interface 15 input can in some embodiments be passed to the point of interest analyser/selector 101.

The operation of receiving a touch/UI input is shown in FIG. 3 by step 205.

In some embodiments the audio enhanced cinemagraph generator comprises the microphone or microphone array 11 or any suitable means for generating or inputting (receiving) at least one audio signal. The array of microphones 11 are configured to record or capture audio signals from different locations and thus be able to identify or determine audio source and their relative direction to the apparatus. The audio signals from the microphone array 11 can in some embodiments be passed to a spatial audio analyser 104.

In some embodiments the audio enhanced cinemagraph generator comprises a spatial audio analyser 104 (or means for analysing the at least one audio signal) configured to receive the audio signals from the microphone array and analyse the direction of the separate sound or audio sources (or objects) within the audio scene being recorded. In some embodiments the spatial audio analyser 104 is configured to output the detected sources or objects to an audio track generator 107. Furthermore in some embodiments the detected sources or objects can be passed to the point of interest analyser/selector 101 (as shown by the dashed line between the spatial audio analyser 104 and point of interest analyser/selector 101.

An example spatial analysis, determination of sources and parameterisation of the audio signal is described as follows. However it would be understood that any suitable audio signal spatial or directional analysis in either the time or other representational domain (frequency domain etc.) can be implemented to determine directional (and/or temporal) audio source information.

In some embodiments the spatial audio analyser 104 comprises a framer. The framer or suitable framer means can be configured to receive the audio signals from the microphones and divide the digital format signals into frames or groups of audio sample data. In some embodiments the framer can furthermore be configured to window the data using any suitable windowing function. The framer can be configured to generate frames of audio signal data for each microphone input wherein the length of each frame and a degree of overlap of each frame can be any suitable value. For example in some embodiments each audio frame is 20 milliseconds long and has an overlap of 10 milliseconds between frames. The framer can be configured to output the frame audio data to a Time-to-Frequency Domain Transformer.

In some embodiments the spatial audio analyser 104 comprises a Time-to-Frequency Domain Transformer. The Time-to-Frequency Domain Transformer or suitable transformer means can be configured to perform any suitable time-to-frequency domain transformation on the frame audio data. In some embodiments the Time-to-Frequency Domain Transformer can be a Discrete Fourier Transformer (DFT). However the Transformer can be any suitable Transformer such as a Discrete Cosine Transformer (DCT), a Modified Discrete Cosine Transformer (MDCT), a Fast Fourier Transformer (FFT) or a quadrature mirror filter (QMF). The Time-to-Frequency Domain Transformer can be configured to output a frequency domain signal for each microphone input to a sub-band filter.

In some embodiments the spatial audio analyser 104 comprises a sub-band filter. The sub-band filter or suitable means can be configured to receive the frequency domain signals from the Time-to-Frequency Domain Transformer for each microphone and divide each microphone audio signal frequency domain signal into a number of sub-bands.

The sub-band division can be any suitable sub-band division. For example in some embodiments the sub-band filter can be configured to operate using psychoacoustic filtering bands. The sub-band filter can then be configured to output each domain range sub-band to a direction analyser.

In some embodiments the spatial audio analyser 104 can comprise a direction analyser. The direction analyser or suitable means can in some embodiments be configured to select a sub-band and the associated frequency domain signals for each microphone of the sub-band.

The direction analyser can then be configured to perform directional analysis on the signals in the sub-band. The directional analyser can be configured in some embodiments to perform a cross correlation between the microphone/decoder sub-band frequency domain signals within a suitable processing means.

In the direction analyser the delay value of the cross correlation is found which maximises the cross correlation of the frequency domain sub-band signals. This delay can in some embodiments be used to estimate the angle or represent the angle from the dominant audio signal source for the sub-band. This angle can be defined as $\alpha$. It would be understood that whilst a pair or two microphones can provide a first angle, an improved directional estimate can be produced by using more than two microphones and preferably in some embodiments more than two microphones on two or more axes.

The directional analyser can then be configured to determine whether or not all of the sub-bands have been selected. Where all of the sub-bands have been selected in some embodiments then the direction analyser can be configured to output the directional analysis results. Where not all of the sub-bands have been selected then the operation can be passed back to selecting a further sub-band processing step.

The above describes a direction analyser performing an analysis using frequency domain correlation values. However it would be understood that the direction analyser can perform directional analysis using any suitable method. For example in some embodiments the object detector and separator can be configured to output specific azimuth-elevation values rather than maximum correlation delay values. Furthermore in some embodiments the spatial analysis can be performed in the time domain.

In some embodiments this direction analysis can therefore be defined as receiving the audio sub-band data;

$X_k^b(n) = X_k(n_b+n)$, $n=0, \ldots, n_{b+1}-n_b-1, b=0, \ldots, B-1$ where $n_b$ is the first index of bth subband. In some embodiments for every subband the directional analysis as described herein as follows. First the direction is estimated with two channels. The direction analyser finds delay $\tau_b$ that maximizes the correlation between the two channels for subband b. DFT domain representation of e.g. $X_k^b(b)$ can be shifted $T_b$ time domain samples using $$X_{k,\tau_b}^b(n) = X_k^b(n)e^{-j\frac{2\pi n \tau_b}{N}}$$

The optimal delay in some embodiments can be obtained from $$\max_{\tau_b} \text{Re}\left(\sum_{n=0}^{n_{b+1}-n_b-1} \left(X_{2,\tau_b}^b(n)^* X_3^b(n)\right)\right), \tau_b \in [-D_{tot}, D_{tot}]$$

where Re indicates the real part of the result and * denotes complex conjugate. $X_{2,\tau_b}^b$ and $X_3^b$ are considered vectors with length of $n_{b+1}-n_b$ samples. The direction analyser can in some embodiments implement a resolution of one time domain sample for the search of the delay.

In some embodiments the direction analyser can be configured to generate a sum signal. The sum signal can be mathematically defined as.

$$X_{sum}^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

In other words the direction analyser is configured to generate a sum signal where the content of the channel in which an event occurs first is added with no modification, whereas the channel in which the event occurs later is shifted to obtain best match to the first channel.

It would be understood that the delay or shift $\tau_b$ indicates how much closer the sound source is to one microphone (or channel) than another microphone (or channel). The direction analyser can be configured to determine actual difference in distance as $$\Delta_{23} = \frac{v\tau_b}{F_s}$$

where Fs is the sampling rate of the signal and v is the speed of the signal in air (or in water if we are making underwater recordings).

The angle of the arriving sound is determined by the direction analyser as, $$\alpha_b = \pm\cos^{-1}\left(\frac{\Delta_{23}^2 + 2b\Delta_{23} - d^2}{2db}\right)$$

where d is the distance between the pair of microphones/channel separation and b is the estimated distance between sound sources and nearest microphone. In some embodiments the direction analyser can be configured to set the value of b to a fixed value. For example b=2 meters has been found to provide stable results.

It would be understood that the determination described herein provides two alternatives for the direction of the arriving sound as the exact direction cannot be determined with only two microphones/channels.

In some embodiments the direction analyser can be configured to use audio signals from a third channel or the third microphone to define which of the signs in the determination is correct. The distances between the third channel or microphone and the two estimated sound sources are:

$$\delta_b^+ = \sqrt{(h+b\sin(\dot{\alpha}_b))^2 + (d/2 + b\cos(\dot{\alpha}_b))^2}$$

$$\delta_b^- = \sqrt{(h-b\sin(\dot{\alpha}_b))^2 + (d/2 + b\cos(\dot{\alpha}_b))^2}$$

where h is the height of an equilateral triangle (where the channels or microphones determine a triangle), i.e.

$$h = \frac{\sqrt{3}}{2}d.$$

The distances in the above determination can be considered to be equal to delays (in samples) of;

$$\tau_b^+ = \frac{\delta^+ - b}{v} F_s$$

$$\tau_b^- = \frac{\delta^- - b}{v} F_s$$

Out of these two delays the direction analyser in some embodiments is configured to select the one which provides better correlation with the sum signal. The correlations can for example be represented as $$c_b^+ = \text{Re}\left(\sum_{n=0}^{n_{b+1}-n_b-1} \left(X_{sum,\tau_b^+}^b(n)^* X_1^b(n)\right)\right)$$

$$c_b^- = \text{Re}\left(\sum_{n=0}^{n_{b+1}-n_b-1} \left(X_{sum,\tau_b^-}^b(n)^* X_1^b(n)\right)\right)$$

The direction analyser can then in some embodiments determine the direction of the dominant sound source for subband b as:

$$\alpha_b = \begin{cases} \dot{\alpha}_b & c_b^+ \geq c_b^- \\ -\dot{\alpha}_b & c_b^+ < c_b^- \end{cases}$$

In some embodiments the spatial audio analyser 104 comprises a mid/side signal generator. The main content in the mid signal is the dominant sound source found from the directional analysis. Similarly the side signal contains the other parts or ambient audio from the generated audio signals. In some embodiments the mid/side signal generator can determine the mid M and side S signals for the sub-band according to the following equations:

$$M^b = \begin{cases} (X_{2,\tau_b}^b + X_3^b)/2 & \tau_b \leq 0 \\ (X_2^b + X_{3,-\tau_b}^b)/2 & \tau_b > 0 \end{cases}$$

$$S^b = \begin{cases} (X_{2,\tau_b}^b - X_3^b)/2 & \tau_b \leq 0 \\ (X_2^b - X_{3,-\tau_b}^b)/2 & \tau_b > 0 \end{cases}$$

It is noted that the mid signal M is the same signal that was already determined previously and in some embodiments the mid signal can be obtained as part of the direction analysis. The mid and side signals can be constructed in a perceptually safe manner such that the signal in which an event occurs first is not shifted in the delay alignment. Where the distance between the microphones is significant in relation to the distance to the sound source then the mid/side signal generator can be configured to perform a modified mid and side signal determination where the channel is always modified to provide a best match with the main channel.

The mid (M), side (S) and direction ($\alpha$) components of the captured audio signals can in some embodiments be output to an audio track generator and furthermore in some embodiments to the point of interest analyser/selector 101.

The parameterisation of analysis of the audio data is shown in FIG. 3 by step 213.

Figure 10:
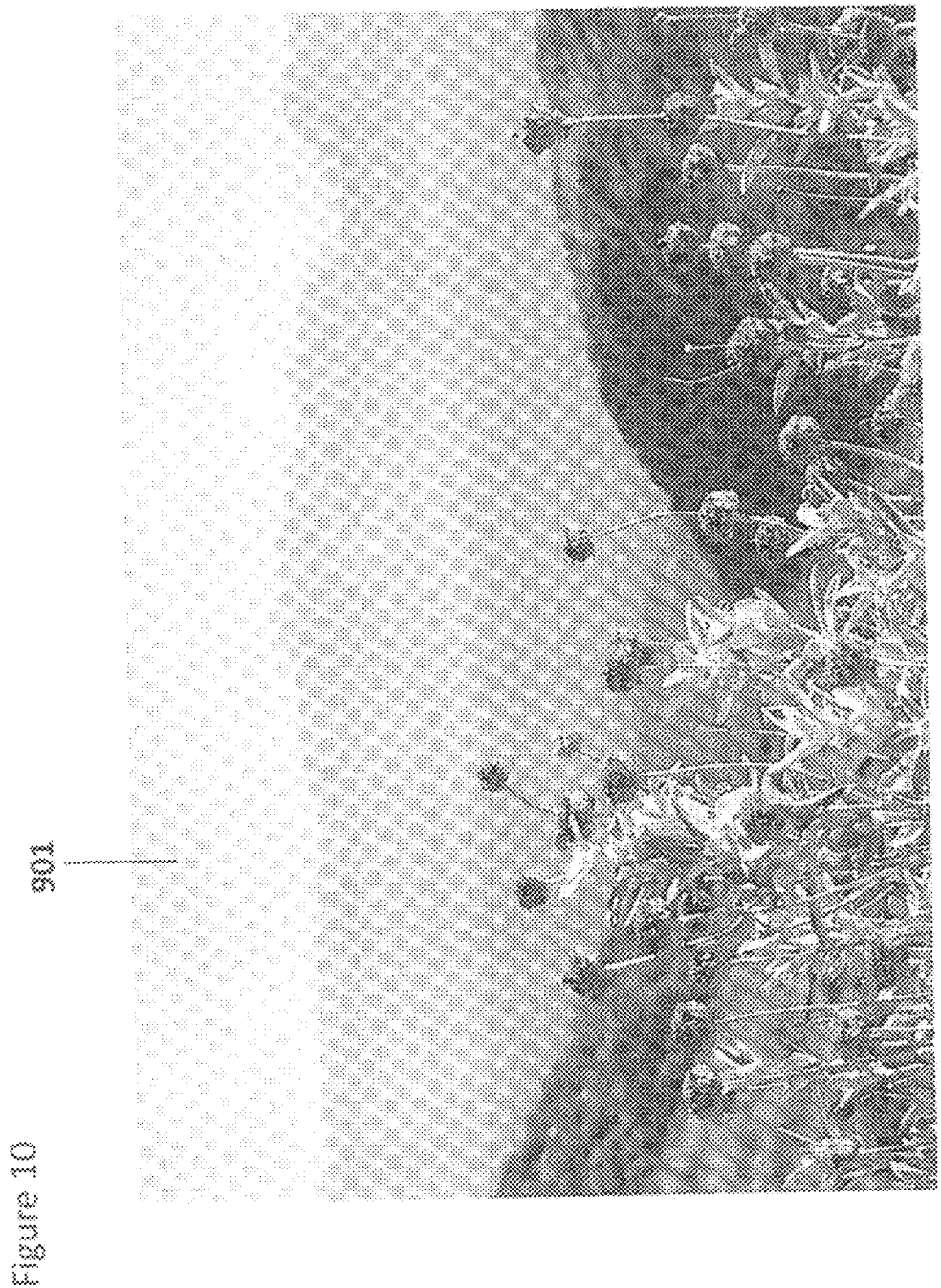
FIGS. 10 to 12 show example images showing point of interest elements detected in an image.

The example audio enhanced cinemagraph generator can in some embodiments comprise a point of interest analyser/selector 101 or means for analysing a point of interest or means for selecting a point of interest. The a point of interest analyser/selector 101 can be configured to receive the image or video data from the 'rear' camera $51_1$ and analyse the video images for point of interest candidate objects or sub-regions for motion/animation and audio mixing. For example as shown in FIG. 10 an example image 901 is shown which can be analysed.

Figure 11:
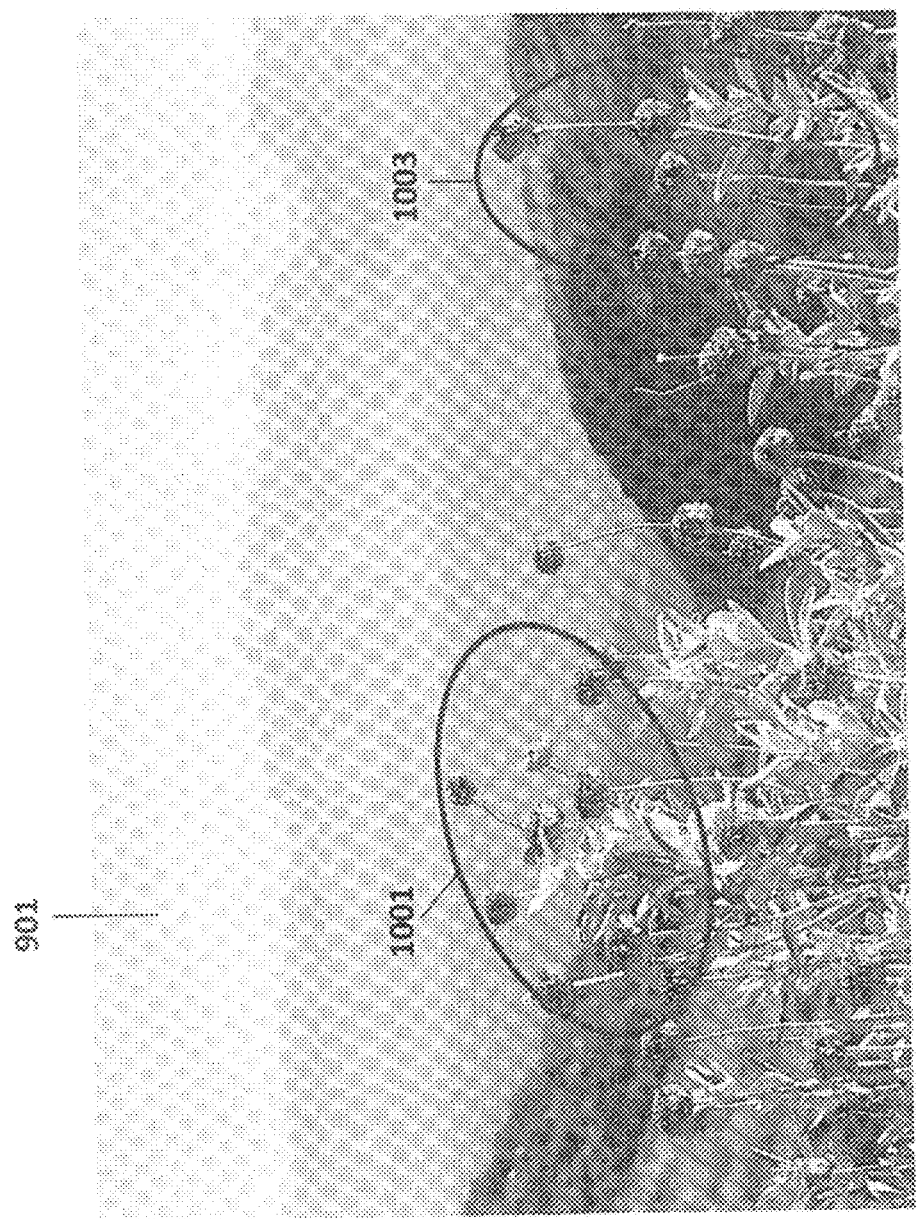

The point of interest analyser/selector 101 or means for analysing the images can thus in some embodiments be configured to apply 'image quality' estimation to determine candidate points of interest. The point of interest can be defined as being at least the width or height equal to that of the entire image. Furthermore as described herein the size of the point of interest can be time-varying. As described herein the candidate points of interest are regions or sub-regions of images where a determined metric is greater than a defined threshold indicating that region is potentially of interest for the user. Such metric measures can include sharpness/blurriness, colour saturation, noise level, contrast, amount of information (entropy) and other determined values. Furthermore in some embodiments the objects, regions or sub-regions are analysed for a relevant periodicity. Furthermore in some embodiments the point of interest analyser/selector 101 can be configured such that it locates motion from two or more consecutive image frames in an image sequence. In some embodiments the algorithm may further track moving objects to obtain at least one point of interest. Furthermore in some embodiments the point of interest analyser/selector 101 can be configured to perform content analysis and pattern recognition on the image(s) to determine at least one point of interest. For example as shown in FIG. 11 the example image 901 as shown in FIG. 10 is analysed and two example points of interest, first point of interest 1001 and second point of interest 1003 are shown indicated by the oval rings.

In some embodiments as described herein the analysis of the video or images to determine points of interest can be assisted by other inputs as described herein.

For example in some embodiments the analysis of the video or images can be assisted by a user interface input such as a touch input indicating where and when the video or image point of interest is on the image(s). In such embodiments the video or images can be displayed on the display. The user may furthermore select using the user interface input (for example touching a region of the display or selecting a region by other means such as keyboard, keypad, mouse or any suitable pointer) a region or area of the displayed image or images as a point of interest.

Similarly in some embodiments the analysis of the video or images can be assisted by a gaze or eye following analysis. As described herein the video or images can be displayed by the display to be watched by the user. In some embodiments the 'front' camera $51_2$ can generate images of the user while they are looking at the display and a gaze or eye following analysis be performed on the images form the 'front' camera $51_1$ to identify when and where candidate position of interests occur.

For example utilizing eye/gaze tracking analysis can determine candidate point of interest details and regions in each image. Furthermore in some embodiments the gaze or eye following analysis can determine points of interest based on the time spent looking at an image and the points and regions of interest. Furthermore any movement of the point of interest can be determined in some embodiments by the trajectories of the eye tracking or gaze around the image.

Furthermore in some embodiments the analysis of the video or images can be assisted by the analysis of the spatial audio signals where the dominant audio sources can provide an indication of where and when the video or image point of interest is on the image(s). In such embodiments the spatial audio signal analysis can be examined to determine from where the dominant sound sources occur and whether they can be associated with regions or points of interest on the image(s). For example a toy train moving in the image can generate an audio signal which during the audio signal analysis indicates a position on the image(s) which can be point of interest candidate. In some embodiments a region in the image emitting a sudden loud audio signal component may be considered as a candidate point of interest.

In some embodiments one or more of the approaches can be used to determine points of interest within the images. For example in some embodiments a well-trained classifier using several of these measures can identify or determine points of interest into good/important ones and poor ones.

The operation of analysing the image data from the 'rear' camera to determine candidate points of interest is shown in FIG. 3 by step 209.

In some embodiments the point of interest analyser/selector 101 or means for selecting points of interest can be configured to select at least one of the points of interest to implement or further process. In some embodiments the selection of the point of interest can be determined by some metric or classifier so that the point of interest is selected automatically using some selecting rule based selection. For example in some embodiments the point of interest analyser/selector can be configured to select a region of the image with dominant motion parameters. In some embodiments the point of interest analyser/selector can be configured to perform the selection semi-automatically using some user input (or gaze or audio direction selector), or manually (in other words completely by the use of the user interface).

In some embodiments the point of interest analyser/selector 101 can be configured to output the selected point of interest information in terms of spatial and temporal information. For example a defined region within an image selected as a point of interest region or interest region can be expressed by determining a position or location (which may be relative to the apparatus) and furthermore in some embodiments by determining a time period within the recorded image and audio range.

In other words determining a position or location associated with the interest region where the position can be used to select an audio source within an audio field or sound field from at least audio signal. In some embodiments the determination of the position or location is can be seen as mapping a region within the image in terms of time and location to an audio scene space position (or location) and time. This interest region defined or determined position and/or time information can then be employed by the audio track generator as described herein to select audio sources within the audio scene.

The selected point of interest information can in some embodiments be passed to a video/image analyser 103 and in some embodiments to an audio track generator 107.

The operation of selecting at least one of the candidate point of interests is shown in FIG. 3 by step 211.

Figure 12:
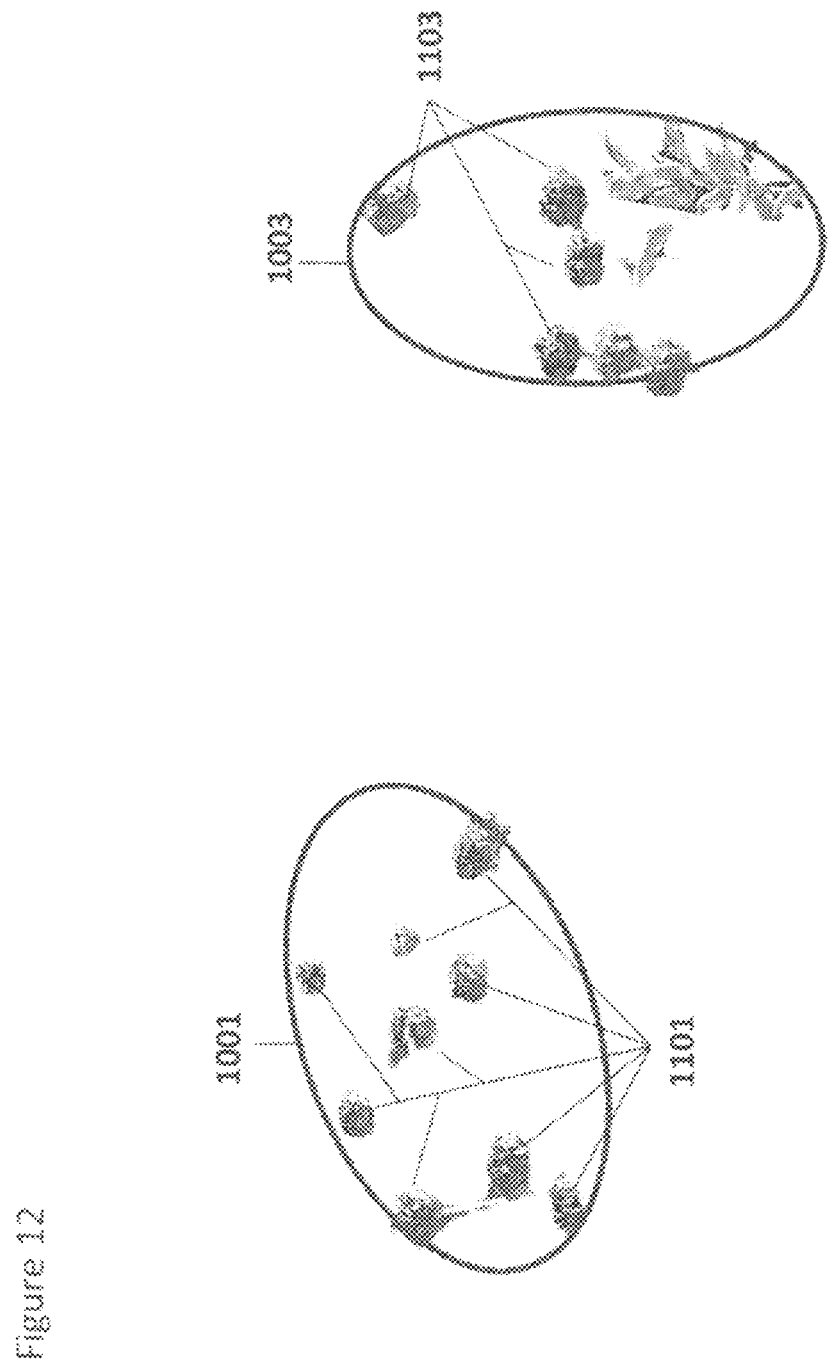

In some embodiments the example audio enhanced cinemagraph generator comprises a video/image analyser 103 or means for analysing the at least one video/image frame. The video/image analyser 103 can in some embodiments be configured to receive the images from the 'rear' camera $51_1$ and also the selected point of interest information and determine within the images animation objects which can be used in the cinemagraph. The analysis performed by the video/image analyser can be any suitable analysis. For example in some embodiments the differences between images or frames in the video within the position or interest regions are determined (in a manner similar to motion vector analysis in video coding). Thus for example with respect to the example image as shown in FIGS. 10 and 11, FIG. 12 shows the point of interest regions, the first point of interest 1001 and second point of interest 1003 shown indicated by the oval rings and example image objects within the point of interest regions which are to be determined to be suitable animation objects. As shown in FIG. 12 there are candidate image objects 1101 within the first point of interest 1001 region and further candidate image objects 1103 within the second point of interest 1003 region.

The video/image analyser 103 can in some embodiments output these image results to the cinemagraph generator 105.

The operation of analysing the visual source directions corresponding to the position of interest selection regions is shown in FIG. 3 by step 219.

In some embodiments the example audio enhanced cinemagraph generator comprises a cinemagraph generator 105 (or animated presentation generator) or means for generating the animated presentation. The cinemagraph generator 105 is configured to receive the images and video and any image/video motion selection data from the video/image analyser 103 and generate suitable cinemagraph data. In some embodiments the cinemagraph generator is configured to generate animated image data however as described herein in some embodiments the animation can be subtle or missing from the image (in other words the image is substantially a static image). The cinemagraph generator 105 can be any suitable cinemagraph or animated image generating means configured to generate data in a suitable format which enables the cinemagraph viewer to generate the image with any motion elements. The cinemagraph generator 105 can be configured in some embodiments to output the generated cinemagraph data to a mixer and synchroniser 109.

The operation of generating the animated image data is shown in FIG. 3 by step 219.

Furthermore in some embodiments the example audio enhanced cinemagraph generator comprises an audio track generator 107 or means for generating an audio track. The audio track generator 107 can be configured to generate at least one audio track (or audio clip or audio signal) component to be inserted or associated with the cinemagraph video or image data. In some embodiments the audio track generator 107 can be configured to receive information from the point of interest analyser/selector 101 such that the audio track generator 107 is configured to generate multiple audio signals from the audio signals.

The operation of generating directional audio signals based on the point of interest selection information is shown in FIG. 3 by step 217.

Figure 4:
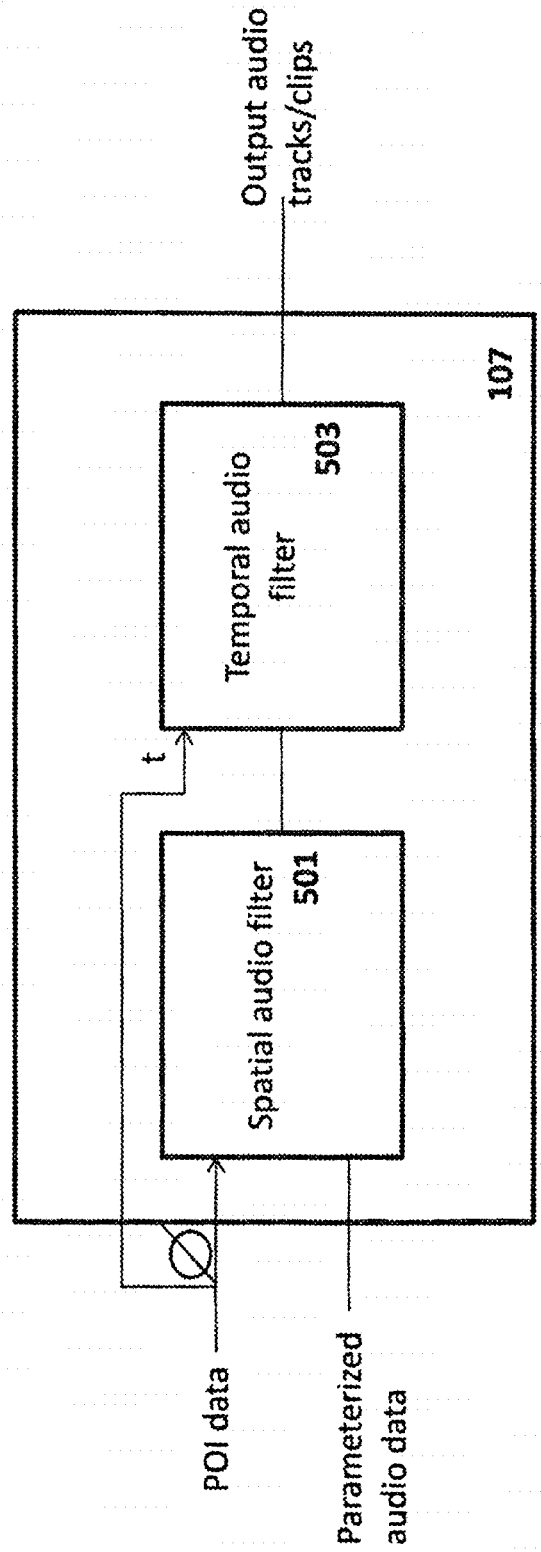
FIG. 4 shows schematically an audio track generator as shown in FIG. 2 according to some embodiments a point of interest analyser/selector as shown in FIG. 2 according to some embodiments.

With respect to FIG. 4 an example audio track generator 107 is shown. Furthermore with respect to FIG. 5 an example of the operation of the example audio track generator 107 as shown in FIG. 4 is shown.

In some embodiments the audio track generator 107 comprises a spatial audio filter 501 or means for spatially filtering at least one audio signal. The spatial audio filter 501 can in some embodiments be configured to receive the point of interest information.

Figure 5:
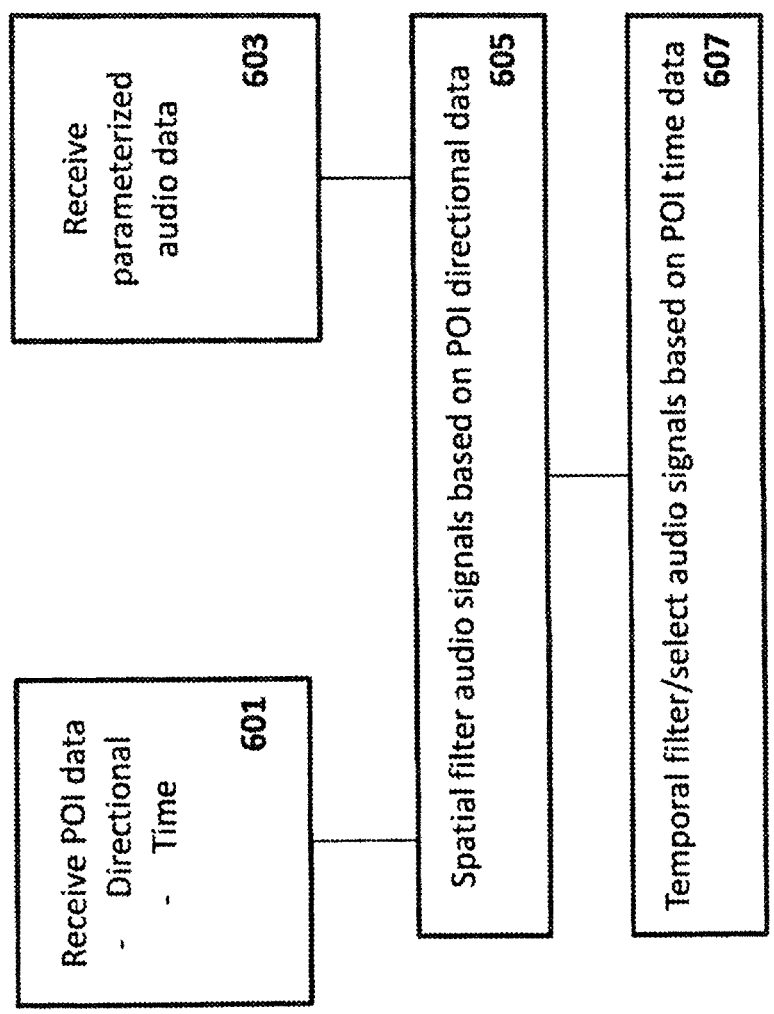
FIG. 5 shows a flow diagram of the operation of the audio track generator as shown in FIG. 4 according to some embodiments.

The operation of receiving the PoI data is shown in FIG. 5 by step 601.

Furthermore in some embodiments the audio track generator 107 and in particular the spatial audio filter 501 can be configured to receive the parameterized audio data.

Figure 6:
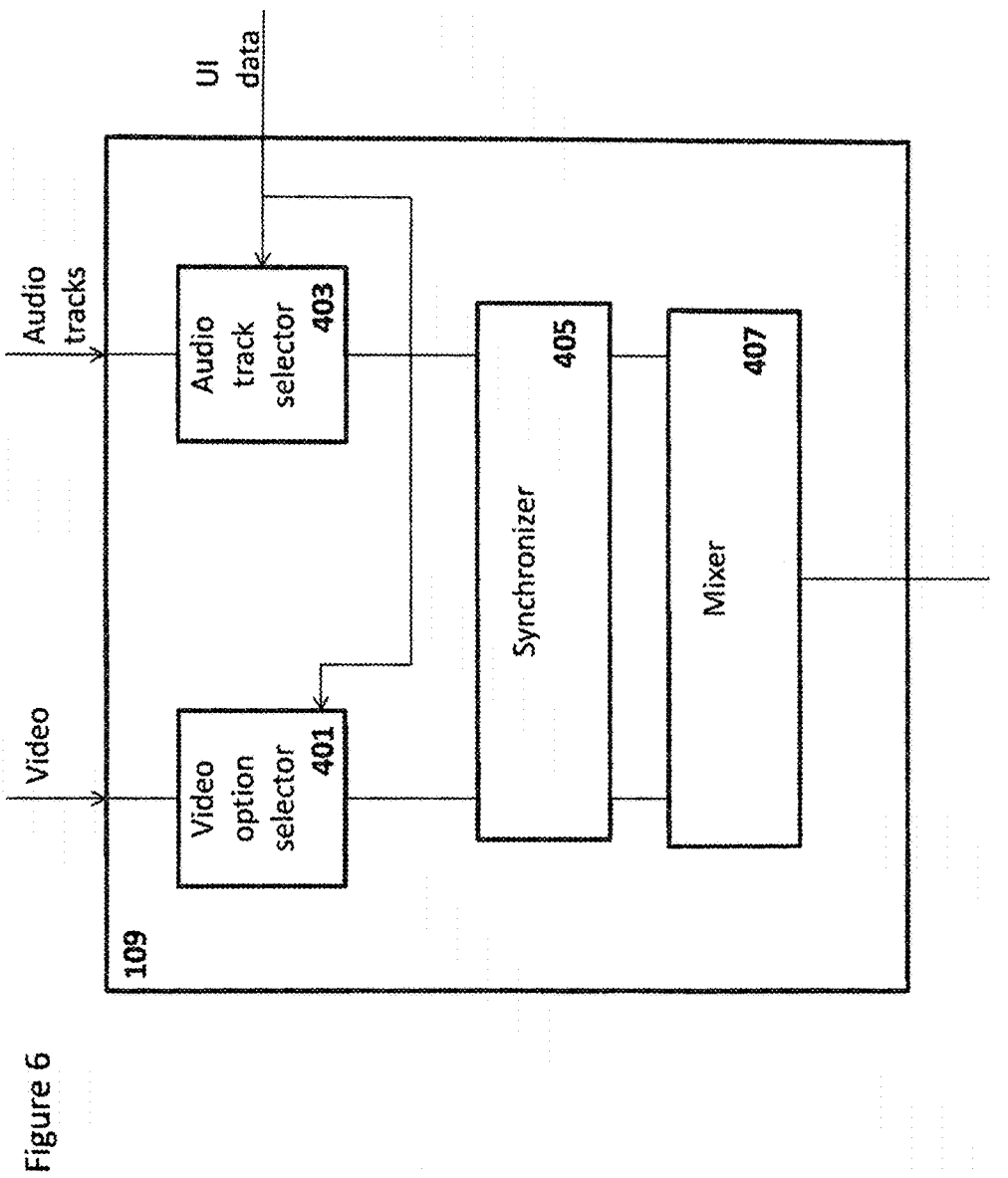
FIG. 6 shows schematically an example mixer and synchroniser as shown in FIG. 2 according to some embodiments.

The operation of receiving the parameterized audio data is shown in FIG. 6 by step 603.

The spatial audio filter 501 can in some embodiments be configured to perform spatial audio filtering on the parameterised data. In some embodiments the spatial filtering can be performed by selecting mid (M) audio signal sub-bands where the angle ($\alpha$) is within the point of interest range of directions. After selecting mid audio signals sub-bands where the angle is within the point of interest range of directions then the ambient side (S) signals can be added to it to generate a synthesised audio signal from the point of interest area.

It would be understood that in some embodiments any suitable spatial filtering of the audio signals from the microphones can be performed.

The spatially filtered audio signals can in some embodiments be passed to the temporal audio filter 503.

The operation of spatially filtering the audio signals is shown in FIG. 5 by step 605.

In some embodiments the audio track generator 107 comprises a temporal audio filter (or means for temporal filtering at least one audio signal) configured to perform temporal filtering of the synthesized audio signal such that the generated audio signal output by the audio track generator 107 has audio signals for the point of interest period indicated by the point of interest analyser/selector 101.

The audio track can then be output to the mixer and synchroniser 109.

The operation of temporal filtering the audio signals is shown in FIG. 5 by step 607.

It would be understood that in some embodiments the operations of temporal and spatial filtering can be performed concurrently or in the reverse order to that described herein (in other words in some embodiments the parameterised audio signals are filtered such that only the frames which are within the selected point of interest time periods are selected and then the spatial filtering of these signals are performed).

Furthermore although the above example describes the generation of a single track from a single point of interest selection it would be understood that in some embodiments multiple point of interest selections can generate multiple tracks. Furthermore in some embodiments the audio track generator can be configured to generate an ambient signal which can be the side (S) signal components as a track. In some embodiments the audio track generator can be configured to generate a mixed audio signal as a signal track.

In some embodiments the apparatus comprises a mixer and synchroniser 109 (or means for mixing and/or means for synchronising) configured to receive both the video images from the cinemagraph generator 105 and the audio signals from the audio track generator 107 and configured to mix and synchronise signals in a suitable manner.

The mixer and synchroniser 109 can comprise a video option selector 401 or means for selecting video data. The video option selector can in some embodiments be configured to receive the video data from the cinemagraph generator 105.

The video data in some embodiments can be displayed on the display and elements of the cinemagraph processed before synchronisation and mixing with the audio signal. For example in some embodiments the display user interface enables an editing of the animation or a control of the animation. For example in some embodiments the display user interface permits the user to provide an input to control whether the object is animated or static, the period of the animation, the object size relative to the background image and so on. In some embodiments the animated objects can be permitted to be controlled during playback. For example in some embodiments the user interface enables an input which controls whether the objects is to be static until touched/animated until touched, or whether the speed or direction of touch on the display when the cinemagraph is played can control the image animation.

In some embodiments the selected video image components and any associated control data can be passed to the synchroniser 405.

In some embodiments the mixer and synchroniser 109 can comprise an audio track selector 403. The audio track selector 403 can in some embodiments be configured to receive the audio track data from the audio track generator 107.

Figure 7:
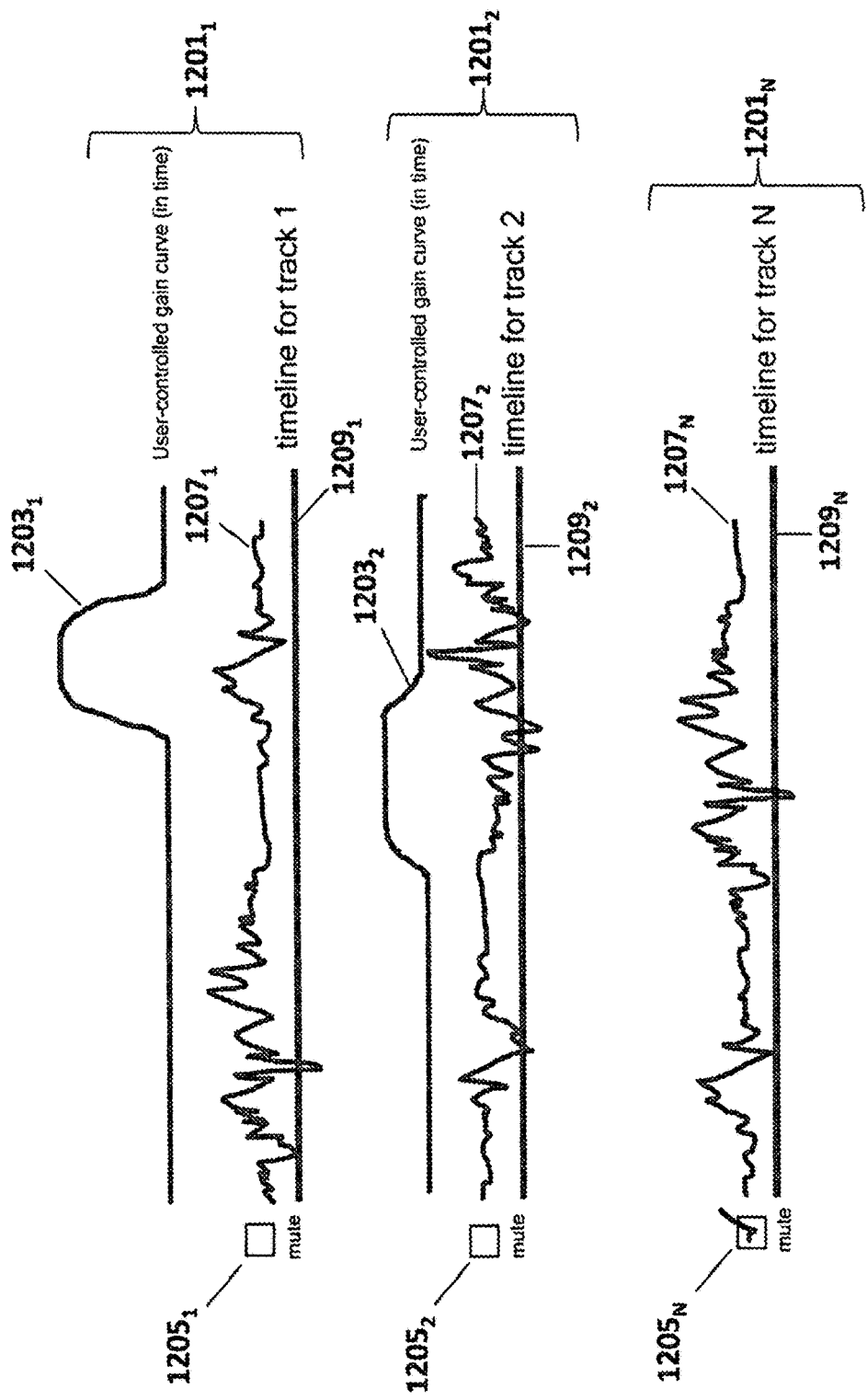
FIG. 7 shows a schematic view of an example UI displayed element for controlling the audio tracks.

The audio track information can in some embodiments be displayed on the display and elements of the audio tracks selected or processed before synchronisation and mixing with the video signal. For example as shown in FIG. 7 an example user interface display of audio track information is shown. In the example shown in FIG. 7 the audio track generator 107 has generated N tracks of which the information of the first track $1201_1$, the second track $1201_2$, and the N'th track $1201_N$ are shown in FIG. 7.

For each of the tracks the example user interface shows the time waveform 1207 for the signal against a timeline 1209 a user controlled gain curve 1203 (which in some embodiments is the display of the temporal filtering of the audio track generator), and mute track control 1205.

In the example shown in FIG. 7 the first track $1201_1$ can represent the audio signal or track associated with the first point of interest, the second track $1201_2$ can represent the audio signal or track associated with the second point of interest and the N'th track $1201_N$ the ambient or side signal. In the example shown in FIG. 7 the ambient or side signal is suppressed by checking or ticking the N'th track mute track control function box $1205_N$.

In some embodiments the audio track control permits fading of the audio track to prevent sudden audio changes. Furthermore in some embodiments control of speed or direction of audio playing can be selected and furthermore the association of the control of the playback of the audio track with any control of the video or animation playback can be selected.

In some embodiments the selected audio tracks and any associated control data can be passed to the synchroniser 405.

The mixer and synchroniser 109 can in some embodiments comprise a synchroniser 405 or means to synchronise or associate the audio data with the video data. The synchroniser 405 can be configured to synchronise the audio signal to the image and the image animation. For example the audio track can be synchronised at the start of an animation loop.

The synchroniser 109 in some embodiments can be configured to output the synchronised audio and video data to the mixer 407.

In some embodiments the mixer and synchroniser 109 can comprise a mixer 407. The mixer 407 can be configured to mix or multiplex the data to form a cinemagraph or animated image metadata file comprising both image or video data and audio signal data. In some embodiments this mixing or multiplexing of data can generate a file comprising at least some of: video data, audio data, sub region identification data and time synchronisation data according to any suitable format. The mixer and synchroniser 109 can in some embodiments output the metadata or file output data.

Figure 8:
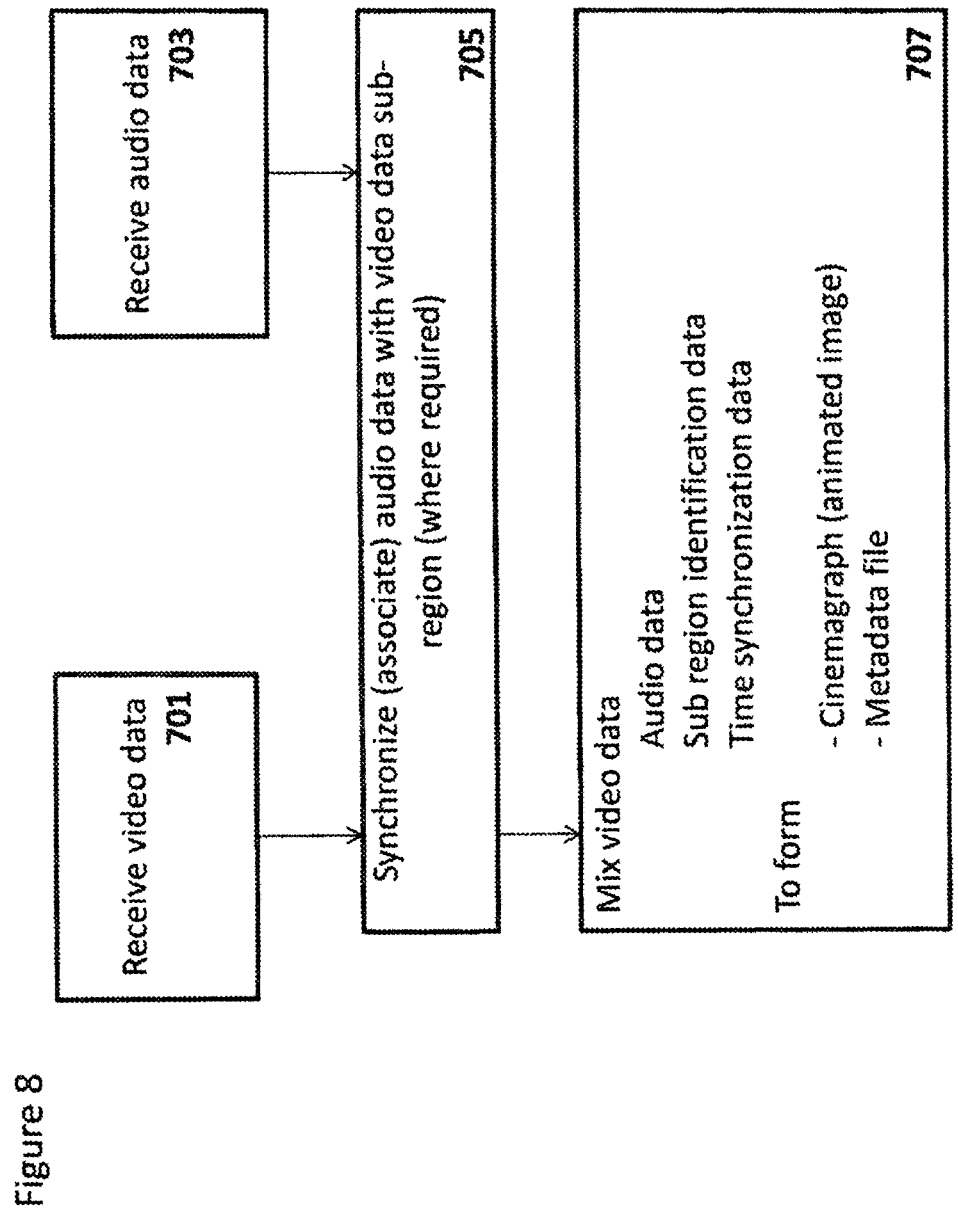
FIG. 8 shows a flow diagram of the operation of the mixer and synchroniser as shown in FIG. 2 according to some embodiments.

The operation of mixing the data is shown in FIG. 8 by step 707.

Figure 9:
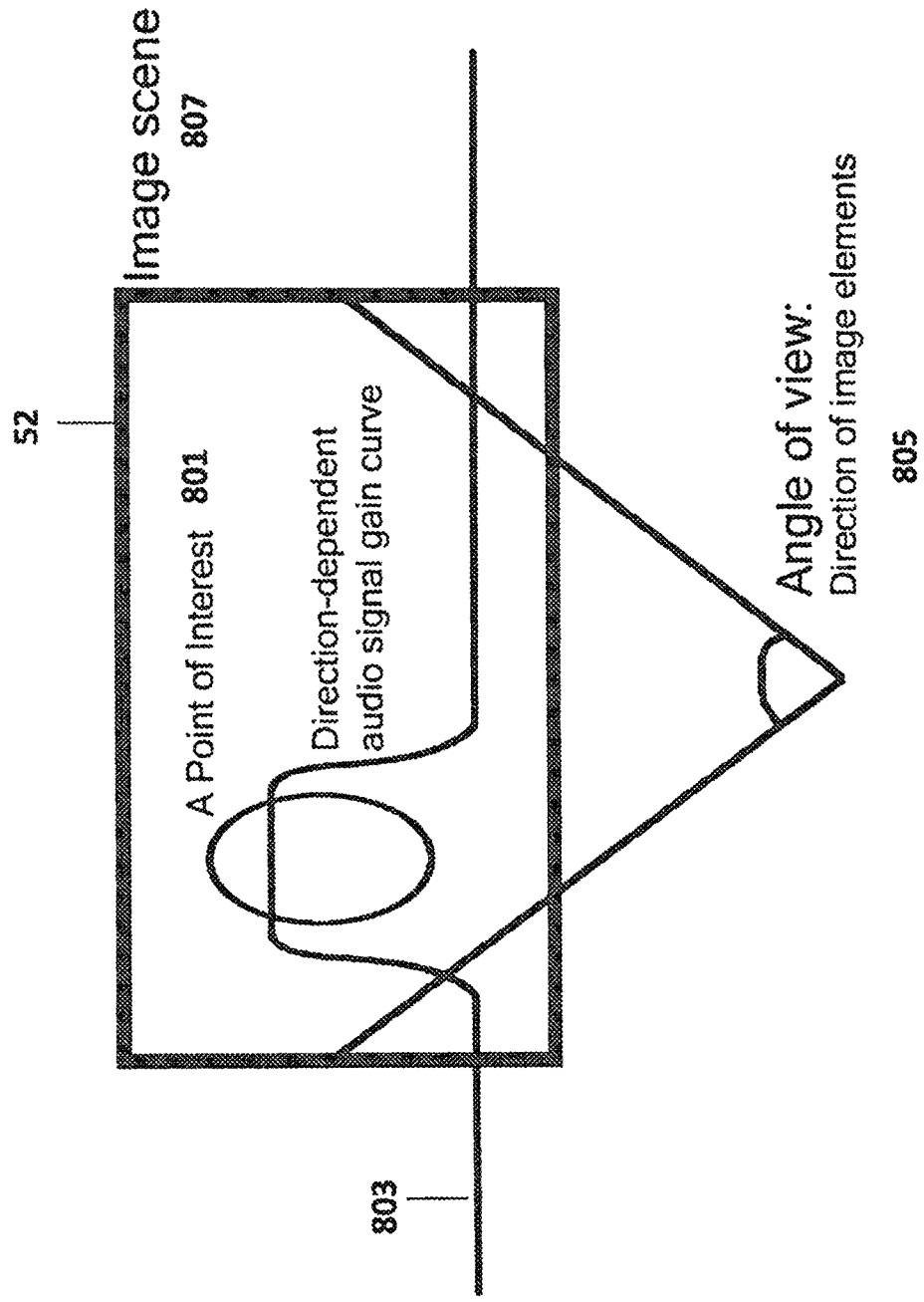
FIG. 9 shows a schematic view of example single point of interest directional analysis according to some embodiments.

With respect to FIG. 9 a schematic view of the directional filtering of an audio signal based on the point of interest is shown. In this example the point of interest 801 as shown with respect to the image scene 807 on the display 52 is configured to generate a direction dependent audio signal gain curve 803 which is defined by the angle of view 805.

It shall be appreciated that the term user equipment is intended to cover any suitable type of wireless user equipment, such as mobile telephones, portable data processing devices or portable web browsers. Furthermore, it will be understood that the term acoustic sound channels is intended to cover sound outlets, channels and cavities, and that such sound channels may be formed integrally with the transducer, or as part of the mechanical integration of the transducer with the device.

In general, the design of various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The design of embodiments of this invention may be implemented by computer software executable by a data processor of the mobile device, such as In the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory used in the design of embodiments of the application may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Embodiments of the inventions may be designed by various components such as integrated circuit modules.

As used in this application, the term 'circuitry' refers to all of the following:
(a) hardware-only circuit implementations (such as implementations in only analog and/or digital circuitry) and
(b) to combinations of circuits and software (and/or firmware), such as: (i) to a combination of processor(s) or (ii) to portions of processor(sysoftware (including digital signal processor(s)), software, and memory(ies) that work together to cause an apparatus, such as a mobile phone or server, to perform various functions and
(c) to circuits, such as a microprocessor(s) or a portion of a microprocessor(s), that require software or firmware for operation, even if the software or firmware is not physically present.

This definition of 'circuitry' applies to all uses of this term in this application, including any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or applications processor integrated circuit for a mobile phone or similar integrated circuit in server, a cellular network device, or other network device.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method comprising:
defining at least one region within an image as an interest region;
from among sound sources in the image, determining at least one audio signal associated with the at least one region based upon a direction of arrival of the at least one audio signal as recorded by a microphone or microphone array, wherein determining at least one audio signal based on the direction of arrival comprises processing the at least one audio signal based on the at least one region to generate at least one positional audio signal part and synthesizing the at least one audio signal from the at least one positional audio signal part; and
generating an animated image comprising the at least one region and the at least one audio signal, wherein generating the animated image comprises separately controlling the at least one audio signal associated with the at least one region relative to an audio signal associated with another region or representative of ambient audio.

2. The method as claimed in claim 1, further comprising capturing the image using at least one camera associated with an apparatus and displaying the image on a display associated with the apparatus.

3. The method as claimed in claim 1, wherein defining at least one region comprises at least one of:
analyzing the image to determine the at least one region;
receiving a user input defining the at least one region;
receiving a touch input over a displayed version of the image defining the at least one region;
analyzing eye/gaze positioning of a displayed version of the image to determine the at least one region; and
analyzing the at least one audio signal associated with the image to determine the at least one region.

4. The method as claimed in claim 1, wherein processing at least one audio signal based on the at least one region to generate at least one positional audio signal part comprises:
analyzing the at least one audio signal to determine at least one positional component;
selecting the at least one positional component based on the at least one region; and
synthesizing the at least one audio signal from the at least one positional component.

5. The method as claimed in claim 4, wherein synthesizing the at least one audio signal from the at least one of the positional components further comprises synthesizing the at least one audio signal from the at least one positional component and a non-positional/ambient audio signal component.

6. The method as claimed in claim 1, wherein processing at least one audio signal based on the at least one region to generate at least one positional audio signal part comprises separating the at least one audio signal into at least two parts based on the at least one region.

7. A method comprising:
defining at least one region within an image as an interest region;
from among sound sources in the image, determining at least one audio signal associated with the at least one region based upon a direction of arrival of the at least one audio signal as recorded by a microphone or microphone array;
determining a time period associated with the at least one region; and
generating an animated image comprising the at least one region and the at least one audio signal, wherein generating the animated image comprises separately controlling the at least one audio signal associated with the at least one region relative to an audio signal associated with another region or representative of ambient audio, and wherein generating an animated image further comprises generating the at least one audio signal based on the at least one region and the time period associated with the at least one region.

8. The method as claimed in claim 7, wherein determining the at least one audio signal based on the at least one region and the time period associated with the at least one region comprises:
- spatially and temporally processing the at least one audio signal based on the at least one region and time period associated with the at least one region to generate at least one spatially and temporally processed audio signal part; and
- synthesizing the at least one audio signal from the at least one spatially and temporally processed audio signal part.

9. The method as claimed in claim 1, further comprising:
- displaying the at least one positional audio signal part on the display;
- displaying at least one control element associated with the at least one positional audio signal part on the display; and
- controlling application of the at least one positional audio signal part based on an input associated with the at least one control element.

10. The method as claimed in claim 9, wherein displaying at least one control element associated with the at least one positional audio signal part on the display comprises at least one of:
- displaying a muting control element associated with the at least one positional audio signal part on the display, wherein the at least one positional audio signal part is muted/unmuted based on the input associated with the muting control element;
- displaying a volume control element associated with the at least one positional audio signal part on the display, wherein a volume of the at least one positional audio signal part is based on the input associated with the volume control element; and
- displaying a fading control element associated with the at least one positional audio signal part on the display, wherein a fading up/fading down of the at least one positional audio signal part is based on the input associated with the fading control element.

11. The method as claimed in claim 1, wherein defining at least one region within an image as an interest region comprises:
- defining at least two regions within the image; and
- selecting at least one region from the at least two regions within the image as the interest region.

12. The method as claimed in claim 2, wherein determining a position associated with the at least one region comprises determining a position relative to an apparatus.

13. The method as claimed in claim 1, further comprising determining a touch input towards defining the at least one region within the image and wherein the touch input is provided from a user interface to select the interest region.

14. The method as claimed in claim 1, wherein determining the at least one audio signal further comprises generating the at least one audio signal from the microphone or microphone array in such a way that the generated at least one audio signal is passed to an analyzer so as to determine the at least one audio signal.

15. The method as claimed in claim 14, wherein the analyzer further comprises a mid/side signal generator in such a way that a mid signal is generated comprising a dominant sound source as a direction and a side signal is generated comprising an ambient sound source.

16. The method as claimed in claim 1, further comprising mixing and synchronizing the at least one audio signal and a video data of the at least one region for the animated image.

17. An apparatus comprising:
- an analyzer configured to define at least one region within an image as a point of interest region;
- an audio generator configured to determine, from among sound sources in the image, at least one audio signal associated with the at least one region based upon a direction of arrival of the at least one audio signal as recorded by a microphone or microphone array, wherein the audio generator is configured to determine at least one audio signal based on the direction of arrival by processing the at least one audio signal based on the at least one region to generate at least one positional audio signal part and synthesizing the at least one audio signal from the at least one positional audio signal part; and
- a generator configured to generate an animated image comprising the at least one region and the at least one audio signal, wherein the generator is configured to permit separate control of the at least one audio signal associated with the at least one region relative to an audio signal associated with another region or representative of ambient audio.

18. An apparatus comprising at least one processor and at least one memory including computer code for one or more programs, the at least one memory and the computer code configured to with the at least one processor cause the apparatus to at least:
- define at least one region within an image as a point of interest region;
- from among sound sources in the image, determine at least one audio signal associated with the at least one region based upon a direction of arrival of the at least one audio signal as recorded by a microphone or microphone array, wherein the apparatus is caused to determine at least one audio signal based on the direction of arrival by processing the at least one audio signal based on the at least one region to generate at least one positional audio signal part and synthesizing the at least one audio signal from the at least one positional audio signal part; and
- generate an animated image comprising the at least one region and the at least one audio signal, wherein the at least one memory and the computer code are configured to with the at least one processor cause the apparatus to generate the animated image by separately controlling the at least one audio signal associated with the at least one region relative to an audio signal associated with another region or representative of ambient audio.

19. The method as claimed in claim 1 further comprising determining a position associated with the at least one region.

20. The apparatus as claimed in claim 17 wherein the analyser is also configured to determine a position associated with the at least one region.

21. The apparatus as claimed in claim 18 wherein the at least one memory and the computer code are configured to with the at least one processor cause the apparatus to determine a position associated with the at least one region.

22. An apparatus comprising at least one processor and at least one memory including computer code for one or more programs, the at least one memory and the computer code configured to with the at least one processor cause the apparatus to at least:
- define at least one region within an image as a point of interest region;
- from among sound sources in the image, determine at least one audio signal associated with the at least one region based upon a direction of arrival of the at least one audio signal as recorded by a microphone or microphone array;
- determine a time period associated with the at least one region; and
- generate an animated image comprising the at least one region and the at least one audio signal, wherein the apparatus is caused to generate the animated image by separately controlling the at least one audio signal associated with the at least one region relative to an audio signal associated with another region or representative of ambient audio, and wherein the apparatus is further caused to generate an animated image by generating the at least one audio signal based on the at least one region and the time period associated with the at least one region.

\* \* \* \* \*